(12) United States Patent
Link, II

(10) Patent No.: US 10,187,357 B2
(45) Date of Patent: Jan. 22, 2019

(54) METHOD AND SYSTEM FOR INTERNETWORK COMMUNICATION WITH MACHINE DEVICES

(71) Applicant: M2MD Technologies, Inc., Atlanta, GA (US)

(72) Inventor: Charles M. Link, II, Atlanta, GA (US)

(73) Assignee: M2MD TECHNOLOGIES, INC., Atlanta, GA (US)

( * ) Notice: Subject to any disclaimer, the term of this patent is extended or adjusted under 35 U.S.C. 154(b) by 228 days.

(21) Appl. No.: 15/093,560

(22) Filed: Apr. 7, 2016

(65) Prior Publication Data

US 2017/0006034 A1 Jan. 5, 2017

Related U.S. Application Data

(60) Provisional application No. 62/188,713, filed on Jul. 5, 2015.

(51) Int. Cl.
*G06F 17/00* (2006.01)
*H04L 29/06* (2006.01)
*H04L 29/12* (2006.01)

(52) U.S. Cl.
CPC ........ *H04L 63/029* (2013.01); *H04L 61/2589* (2013.01); *H04L 61/2592* (2013.01); *H04L 63/0272* (2013.01); *H04L 63/08* (2013.01); *H04L 61/2015* (2013.01); *H04L 61/2514* (2013.01)

(58) Field of Classification Search
None
See application file for complete search history.

(56) References Cited

U.S. PATENT DOCUMENTS

| | | | | |
|---|---|---|---|---|
| 7,441,043 B1* | 10/2008 | Henry | ................. | H04L 29/1233 709/238 |
| 8,800,003 B2* | 8/2014 | Guo | .................... | H04L 63/0823 726/4 |
| 8,949,978 B1* | 2/2015 | Lin | .......................... | G06F 21/51 726/12 |
| 9,231,904 B2* | 1/2016 | Johnson | ................. | H04L 67/34 |
| 2002/0180579 A1* | 12/2002 | Nagaoka | ............. | H04L 12/2803 340/3.1 |

(Continued)

*Primary Examiner* — Christopher A Revak
*Assistant Examiner* — Vadim Savenkov
(74) *Attorney, Agent, or Firm* — John L. Doughty; Doughty Law, L.L.C.

(57) ABSTRACT

A device of a public communication network initiates an action at a destination UE device of a private communication network by transmitting an action request message to a translating device that has a network/logical connection to both networks. The action request message contains security credentials of the initiating device, but does not contain a network address of the destination UE device. The translating device uses the security credentials of the initiating device contained in the action request message to determine a network address of the private network corresponding to the desired destination UE device. The security credentials may also be used to establish a secure connection from the initiating device. The translating device forwards the action request message to the desired destination device at the address associated with the initiator-device security credentials that it received in the action request message. The translating device may be a publish-subscribe broker.

23 Claims, 19 Drawing Sheets

(56) References Cited

U.S. PATENT DOCUMENTS

| | | | |
|---|---|---|---|
| 2007/0204339 A1* | 8/2007 | Bou-Diab | H04L 63/0272 726/15 |
| 2009/0228576 A1* | 9/2009 | Rosenan | G06F 11/3664 709/221 |
| 2010/0094978 A1* | 4/2010 | Runeson | H04L 29/12367 709/221 |
| 2013/0033379 A1* | 2/2013 | Jentoft | H04N 7/185 340/541 |
| 2013/0166965 A1* | 6/2013 | Brochu | A61H 33/00 714/48 |

* cited by examiner

FIG 1

| LAYER | STATE | DESCRIPTION |
|---|---|---|
| EMM | EMM-DEREGISTERED | UE IS NOT ATTACHED TO ANY LTE NETWORK. MME DOES NOT KNOW THE CURRENT LOCATION OF THE UE, BUT MAY HAVE TRACKING AREA (TA) INFORMATION LAST REPORTED BY THE UE |
| EMM | EMM-REGISTERED | UE HAS BEEN ATTACHED TO THE LTE NETWORK AND AN IP ADDRESS HAS BEEN ASSIGNED TO THE UE. AN EPS BEARER HAS BEEN ESTABLISHED. THE MME KNOWS THE CURRENT LOCATION OF THE UE WITH AN ACCURACY OF A CELL OR, AT LEAST, A TRACKING AREA |
| ECM | ECM-IDLE | NO NAS SIGNALLING CONNECTION (ECM CONNECTION) ESTABLISHED YET. UE HAS NOT BEEN ASSIGNED PHYSICAL RESOURCES, I.E. RADIO RESOURCES (SRB/DRB) AND NETWORK RESOURCES (S1 BEARER/S1 SIGNALLING CONNECTION) YET. |
| ECM | ECM-CONNECTED | NAS SIGNALLING CONNECTION (ECM CONNECTION) IS ESTABLISHED. UE HAS BEEN ASSIGNED PHYSICAL RESOURCES, I.E. RADIO RESOURCES (SRB/DRB) AND NETWORK RESOURCES (S1 BEARER/S1 SIGNALLING CONNECTION). |
| RRC | RRC-IDLE | NO RRC CONNECTION IS ESTABLISHED YET. |
| RRC | RRC-CONNECTED | RRC CONNECTION HAS BEEN ESTABLISHED |

FIG 3

| Case | State | User Experience |
|---|---|---|
| A | EMM-DEREGISTERED +ECM-IDLE +RRC-IDLE | • WHEN A UE IS SWITCHED ON FOR THE FIRST TIME AFTER SUBSCRIPTION<br>• WHEN A UE IS SWITCHED ON AFTER STAYING OFF FOR A LONG TIME<br>• NO UE CONTEXT IN THE LTE NETWORK |
| B | EMM-DEREGISTERED +ECM-IDLE +RRC-IDLE | • WHEN A UE IS STITCHED ON WITHIN A CERTAIN PERIOD OF TIME AFTER BEING TURNED OFF<br>• WHEN ECM CONNECTION IS LOST DURING COMMUNICATION DUE TO RADIO LINK FAILURE<br>• SOME UE CONTEXT FROM THE LAST ATTACH CAN STILL BE STORED IN THE NETWORK (e.g. TO AVOID RUNNING AN AKA PROCEDURE DURING EVERY ATTACH PROCEDURE |
| C | EMM-REGISTERED +ECM-CONNECTED +RRC-CONNECTED | • WHEN A UE IS ATTACHED TO THE NETWORK (AN MME) AND IS USING SERVICES (e.g. INTERNET, VoD, LIVE TV, etc.)<br>• THE MOBILITY OF A UE IS HANDLED BY A HANDOVER PROCEDURE |
| D | EMM-REGISTERED +ECM-IDLE +RRC-IDLE | • WHEN A UE IS ATTACHED TO THE NETWORK (AN MME), BUT NOT USING ANY SERVICE<br>• THE MOBILITY OF THE UE IS HANDLED BY A CELL RESELECTION PROCEDURE |

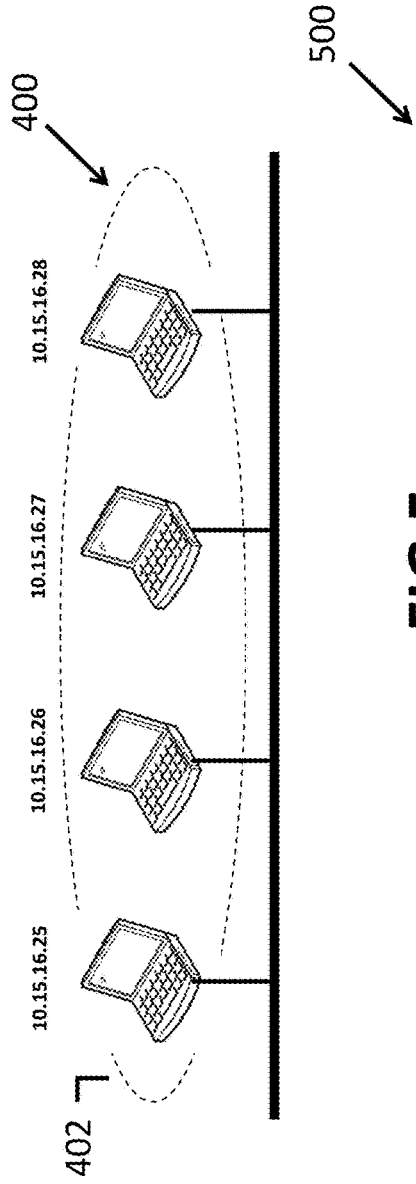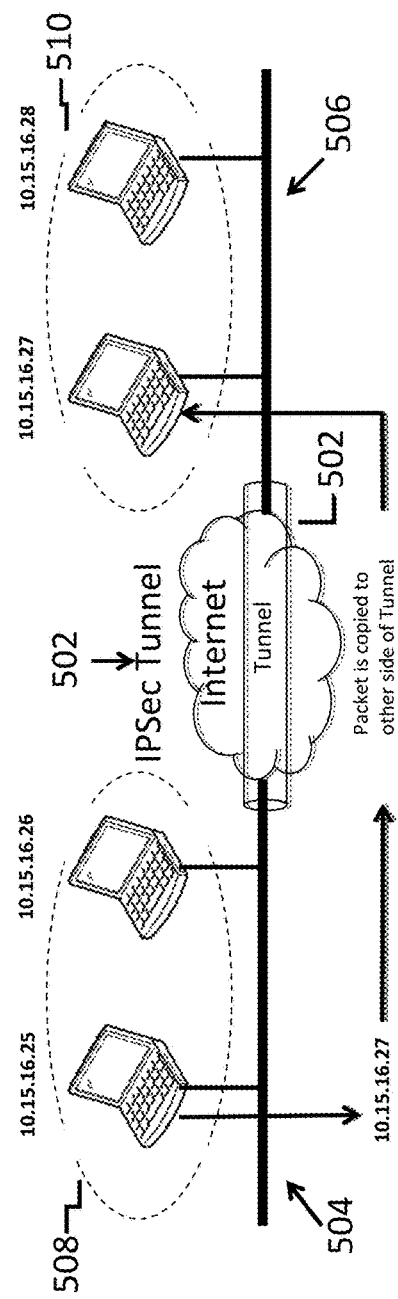

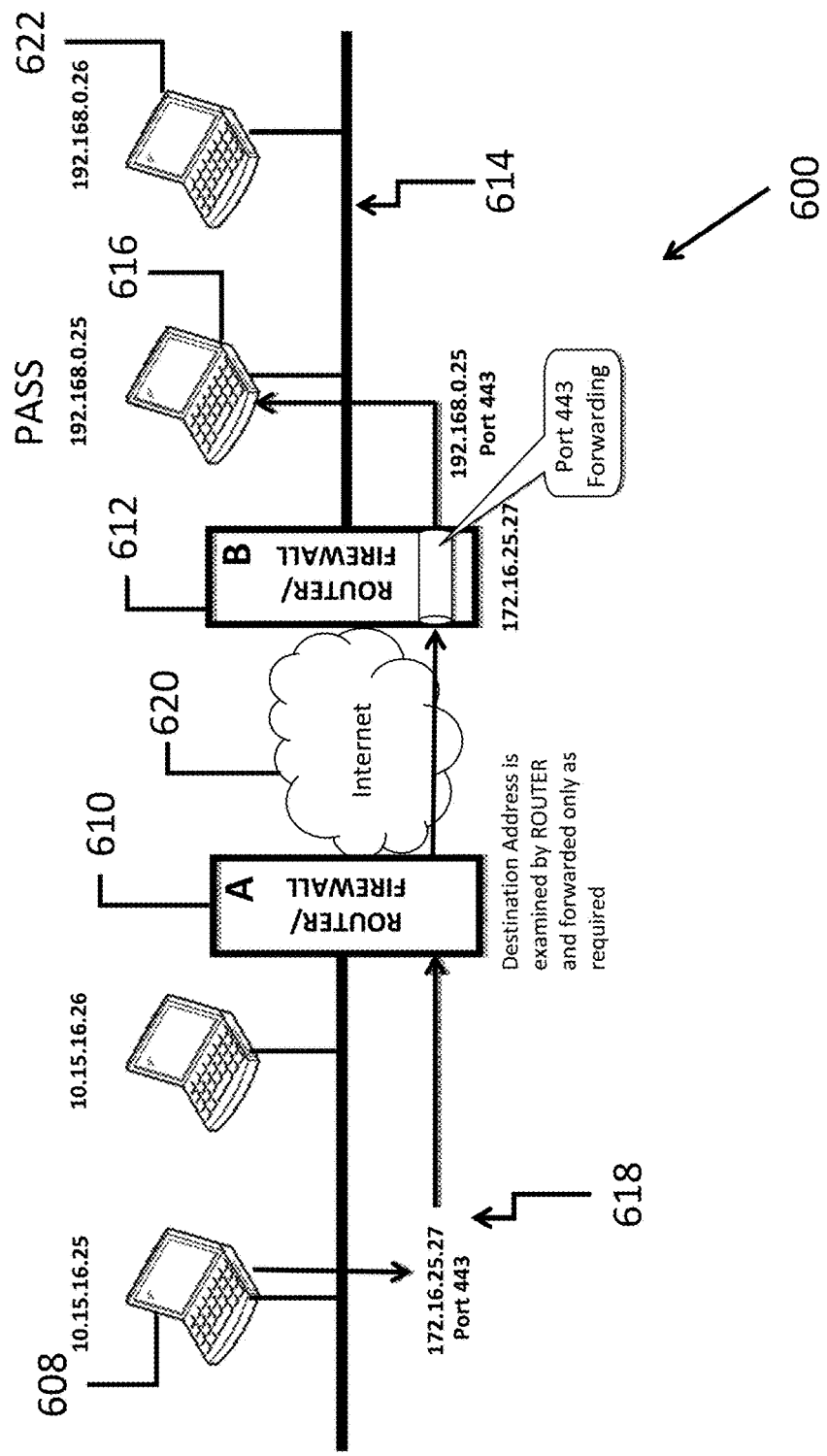

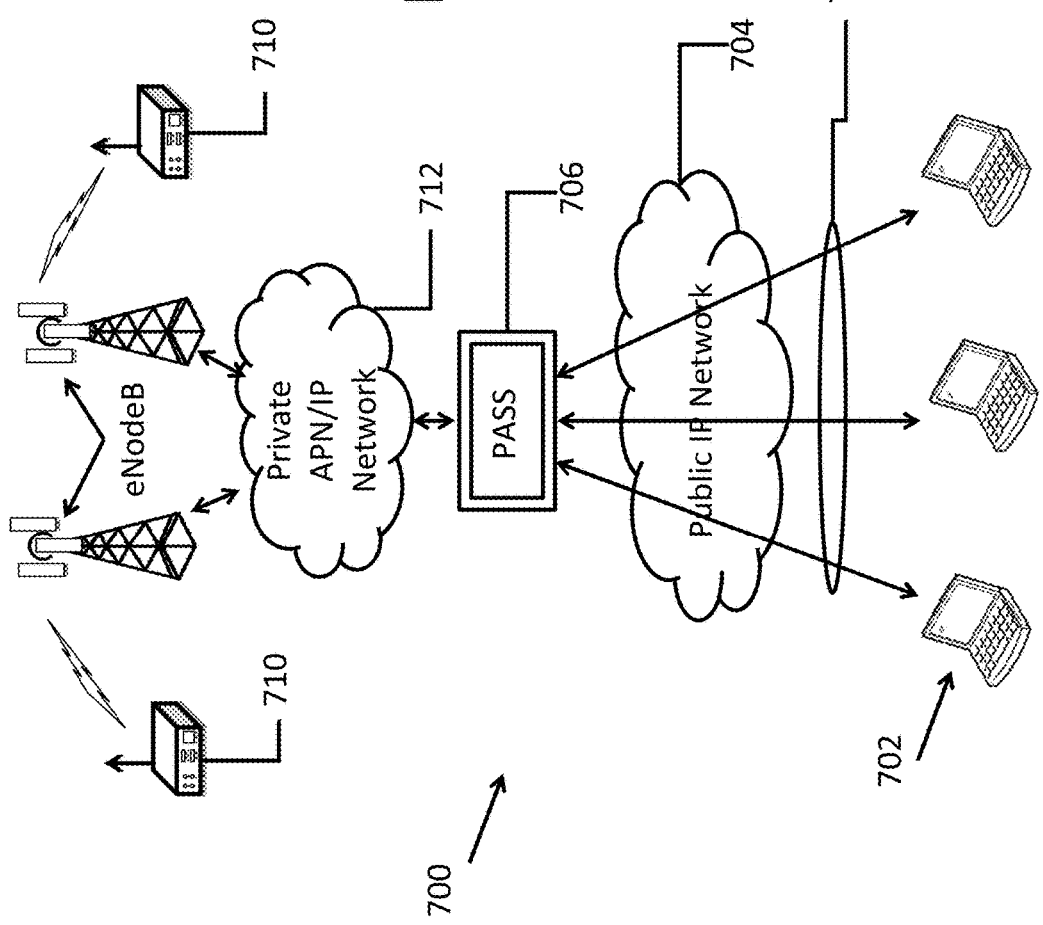

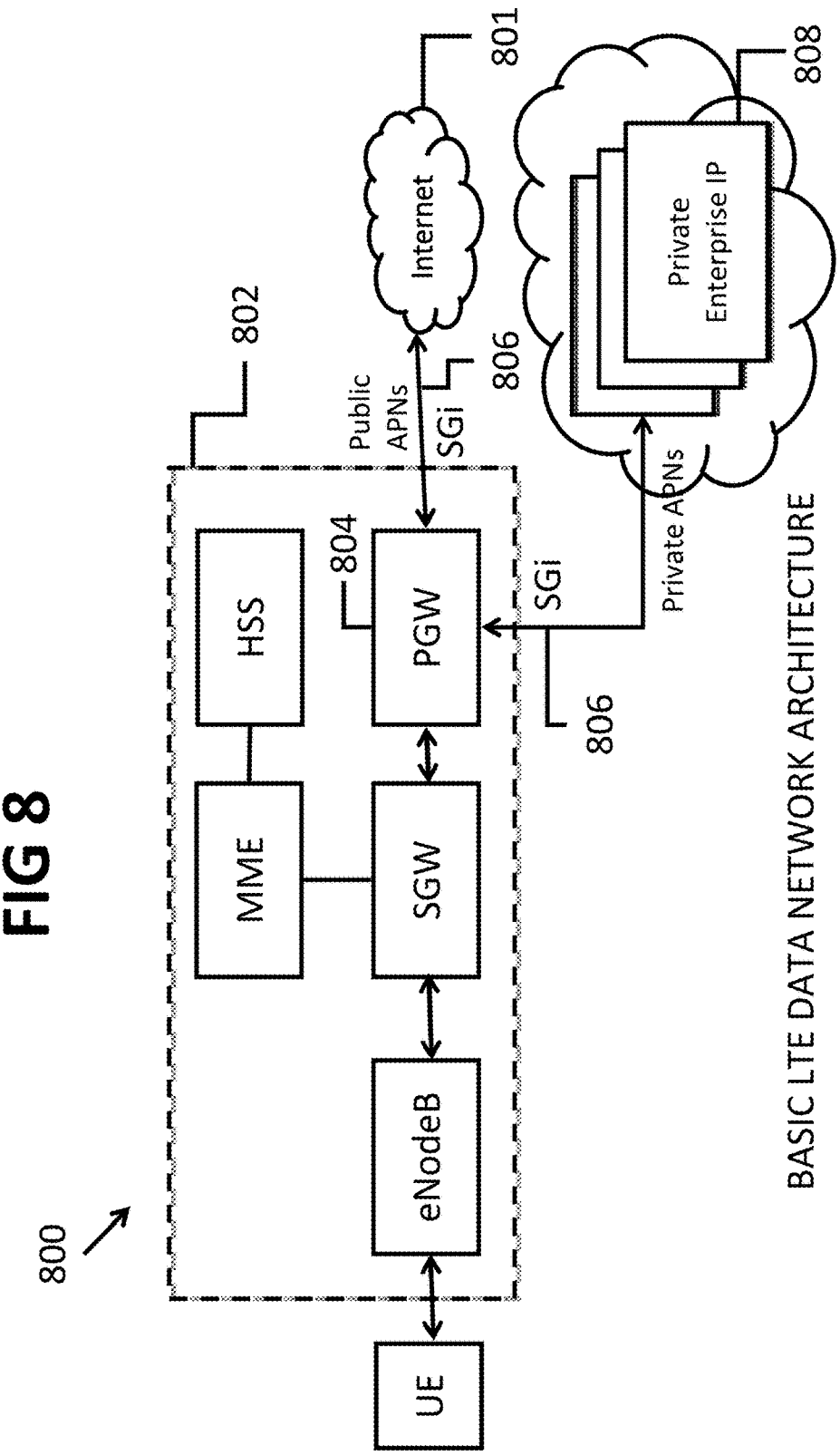

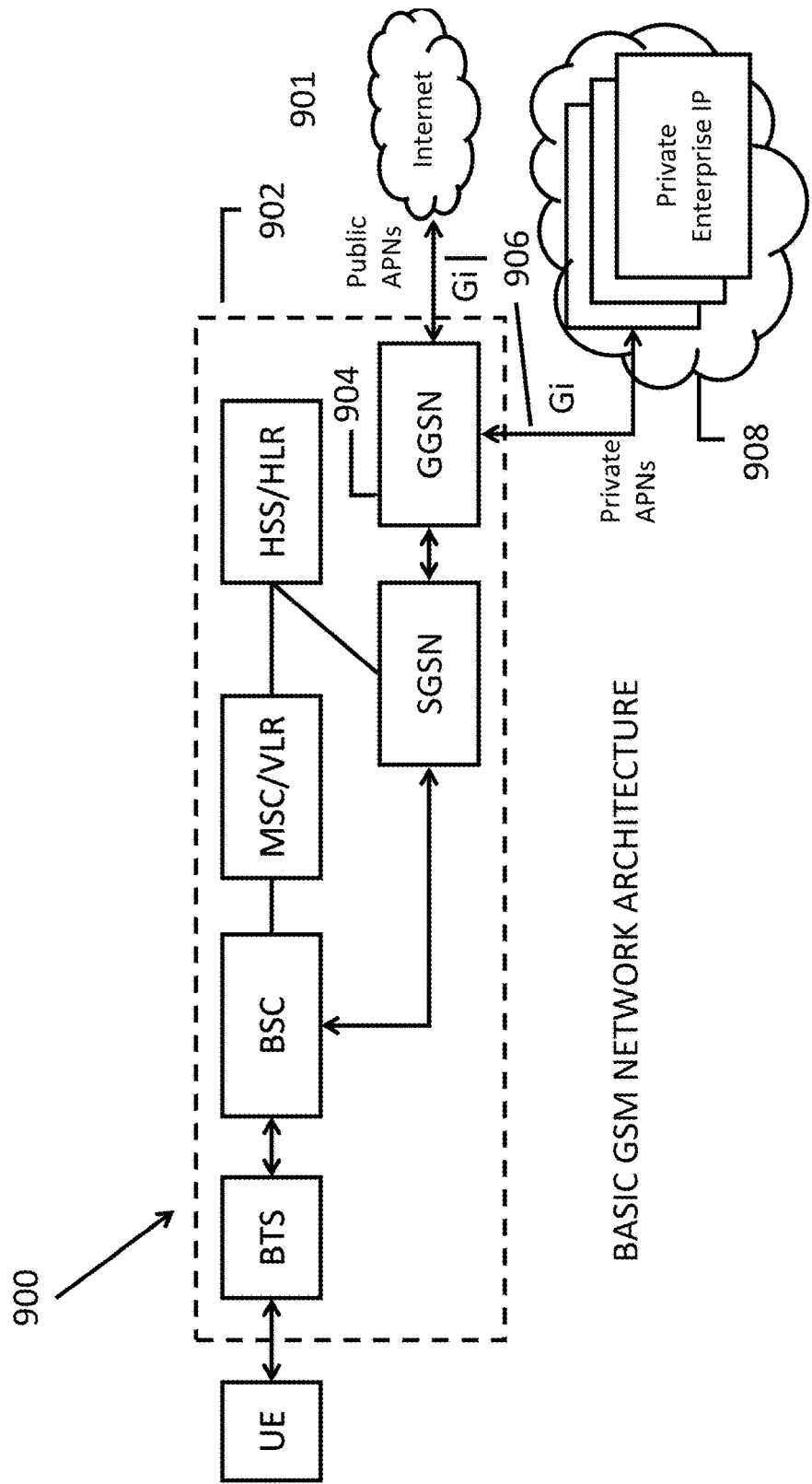

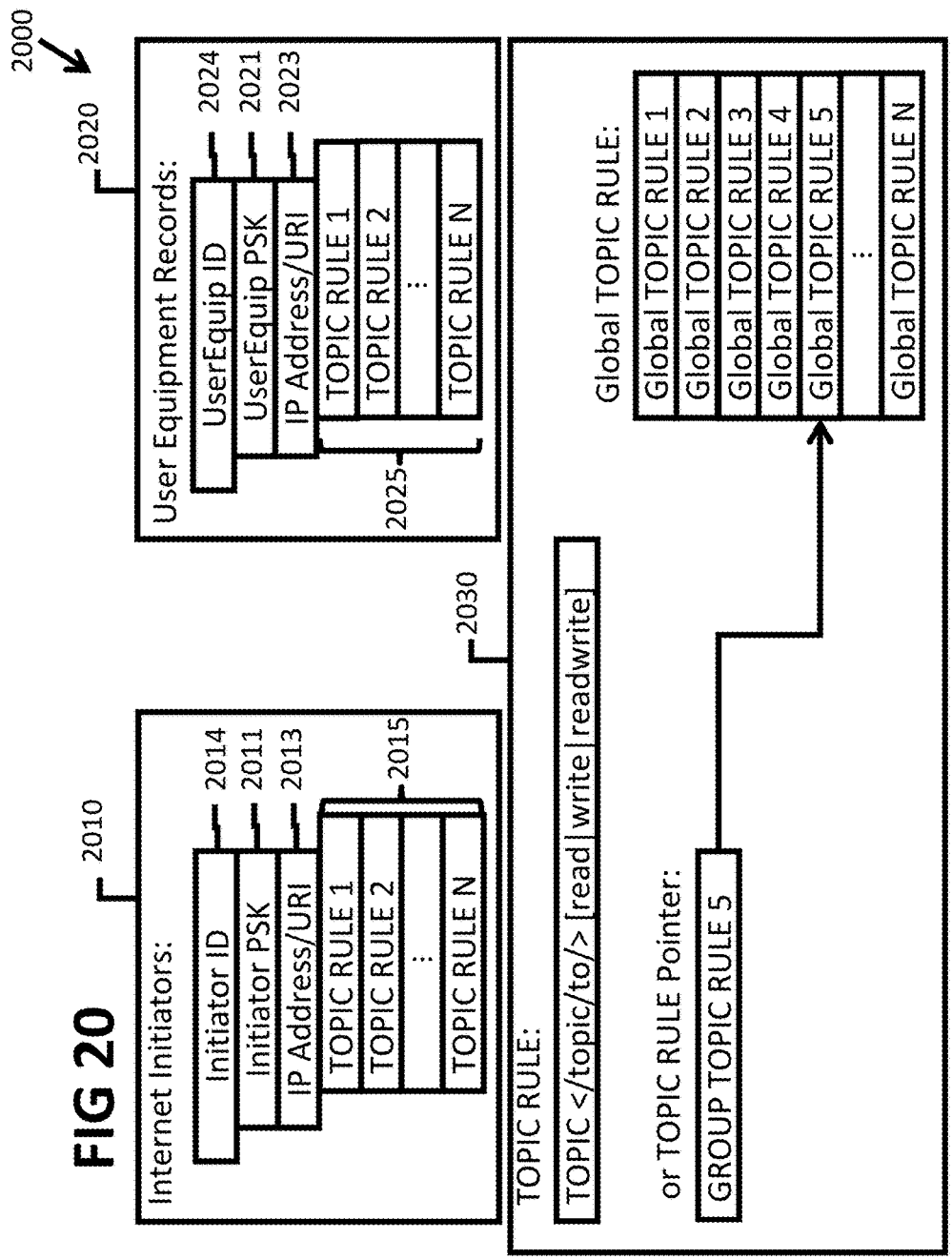

METHOD AND SYSTEM FOR INTERNETWORK COMMUNICATION WITH MACHINE DEVICES

CROSS REFERENCE TO RELATED APPLICATION

This application claims priority under 35 U.S.C. 119(e) to U.S. provisional patent application No. 62/188,713 entitled "Method and system for instant delivery of M2M notifications and messages in an LTE environment," which was filed Jul. 5, 2015, and which is incorporated herein by reference in its entirety.

FIELD

The field relates, generally, to Internet of Things systems and devices and, more particularly, to a system and method for delivering messages, notifications and inquiries to Wireless Wide Area Network ("WWAN") connected devices.

BACKGROUND

The Internet of Things ("IOT") is a recent development in which everyday objects have connectivity to data networks allowing them to send and receive data to other devices or systems. The connectivity enables the devices to achieve greater value and service by exchanging data with other systems, servers and controllers. Sometimes this connectivity is used for remotely monitoring and controlling the connected device. IOT systems generally refer to the integrated use of telecommunications devices in embedded systems for transmitting, receiving, controlling, remotely storing and processing information. More generally, IOT may refer to smart devices sending, receiving, and storing information via telecommunication devices over a public communication network such as the World Wide Web ("WWW").

Other than the convergence of telecommunications and information processing, the term IOT may also refer to automation of various processes relating to the controlling and managing remote devices and systems. For example, in a scenario where an IOT system includes multiple food or beverage vending machines, the IOT system can report the inventory status of remote vending machines, operate e-payment systems that facilitate purchase of items from the vending machine, update content to be displayed on the exterior of one of IOT vending machines, and report interior temperature of one or more of the vending machines to provide an enhanced experience for the customers. In another scenario, an IOT system can allow a homeowner to remotely monitor and control the heating and air conditioning systems utilizing a smart thermostat while communicating over a communication network with one or more centralized servers manage intelligent energy efficiency and to process consolidated energy usage reports. This IOT system may also synchronize the energy usage with other nearby systems to smooth out localized energy usage peaks, lowering overall peak energy demand on public utilities such as electricity and natural gas. In other aspects, the homeowners IOT system may monitor weather conditions and synchronize water usage for non-essential activities such as pool water replenishment and landscape watering.

An IOT device may be connected to a larger network, usually the Internet using an ever-expanding number of methods. Early connected devices were networked with each other using proprietary localized networks created using multi-drop serial networks or simple non-standardized wireless networks. Those devices generally communicated with local gateways or controllers and were rarely remotely operable. As wide area networks were established, creative ideas drove the concept of connecting and controlling devices beyond the reach of the local network. As new technologies drive down costs of embedded electronics, sensors, and network connectivity, interconnection of devices and systems becomes more common.

Another major development that has contributed to the expansion of the IOT is the widespread rollout of centralized "cloud computing" services. Cloud computing allows application software to be operated using centralized, sometimes virtualized, Internet connected services. The foundation of cloud computing is based on the broader concept of shared services and a converged infrastructure. Cloud computing, which some may generally refer to as 'the cloud,' relies on the sharing of resources and the economies of scale to deliver services. Combining the capabilities of the low cost, emerging, and connected smart devices with the expanse of connected cloud computing environments has created a technological opportunity to develop innovative solutions that will enhance automation in nearly every aspect of life.

Early Internet connected devices required complicated and expensive gateways to establish the Internet Protocol ("IP") connectivity. In the early days of the IOT, Ethernet, the primary physical connectivity medium, required expensive and power hungry hardware. The software stacks to implement IP were large and complicated and not easily ported to hardware systems unless the hardware included significant processing power and memory. Many of those IP stacks required an advanced operating system that further drove the hardware complexity. Over the last few years, micro computing and memory technologies have advanced to the point where a full operating system can be ported to very small and cost effective platforms. Some of the new single-chip micro computing platforms that have been introduced over the last five years are powerful enough to include an IP stack, real-time operating system and sensor management to support an advanced smart device.

Advances in the various physical layer communication devices and technologies have also encouraged the deployment of connected devices. For example, Wi-Fi is a wireless local area network ("WLAN") computer networking technology that allows electronic devices to connect directly to the Internet thru a Wi-Fi wireless access point ("WAP"). Wi-Fi networks typically operate using low power transmitters on unlicensed spectrum at either 2.4 GHz or 5 GHz. The specifications for Wi-Fi networks are based upon IEEE 802.11 standards. Although the name "IOT" infers a direct connection to the Internet, in many cases the direct connection is using a medium and technology that is not directly IP. The reasons for selecting a different connection type are many.

Other recently developed technologies that are driving the IOT include ZigBee, Z-wave and of course the various Wireless Wide Area Network ("WWAN") technologies such as GSM, UMTS, and LTE. WWAN technologies differ from WLAN technologies by using different spectrum, protocols, security and authentication systems and the coverage area of a WWAN is typically much larger. WWAN wireless networks are usually operated by mobile telecommunications (or cellular) operators using licensed spectrum. The services may be offered regionally, nationally or globally.

Devices connecting to the Internet using various WWAN technologies are older than the term "Internet of Things." Early non-cellular technologies included Mobitex, DataTAC, and ReFLEX. Each was purpose-built data-networks that supported narrow-band two-way data connectivity. Although the networks existed before the wide acceptance of what we now know of as the Internet, they operated on private wide area networks. As the wireless cellular networks became more refined, systems emerged to leverage the assets of cellular operators. In the United States, Cellular Digital Packet Data ("CDPD") networks were developed and deployed using the unused bandwidth of the AMPS analog mobile networks. While CDPD supported speeds up to 19.2K bits per second, and was significantly faster than Mobitex, DataTAC, or ReFLEX, it could not compete against the slower, less expensive and more flexible Mobitex, DataTAC, or ReFLEX networks.

Outside the US, GSM networks, a second-generation ("2G") technology were being deployed using digital wireless technology, as opposed to the analog networks of AMPS. Being digital, the networks could inherently carry data communications but the connectivity was not usually to a wide area network like the Internet, but to local modem interworking-function platforms that placed an outgoing analog dial-up modem call over the fundamentally analog public switched telephone network ("PSTN"), bridging the digital GSM world with the analog PSTN world. This was called circuit-switched data ("CSD"). The over-arching premise of the CSD solutions depended upon on the mobile device initiating the outgoing connection.

The wireless networks in the United States began to deploy digital wireless technology, principally for voice, in more than a few markets by the mid- to late-1990's. These systems also included a modem interworking-function or CSD that depended on the mobile device to initiate the outgoing interconnection to its destination. As the Internet became popular in the late 1990's, the modems were removed from interworking-function, allowing the device to connect to the Internet directly without going thru an analog modem to the PSTN to reach the Internet. Again, it should be noted that these CSD-connected devices, which could perhaps be considered as the first IOT devices, could initiate outgoing data connections, but could not easily receive incoming data connections from the Internet.

In the early 2000's, the GSM operators began to deploy General Packet Radio Service ("GPRS") technology in their wireless networks. GPRS is a packet oriented mobile data service for GSM 2G and third generation ("3G") networks. Instead of "dialing" thru a CSD connection, GPRS devices access the terrestrial packet network using an access point name ("APN"), username and password. Although the APN may specify access to the public Internet, it may also specify access and connection to a defined endpoint, for example, to a private enterprise network. This was the first system to provide worldwide mobile access to the Internet. As above, it should be noted that these WWAN connected devices initiated the outgoing connection to the external packet networks.

The wireless industry refers to incoming wireless device connections, as mobile terminated ("MT") voice or data connections. MT wireless devices and connections are considered mobile, without regard to the movability of the device. The significant advantage of the early packet data networks such as Mobitex, DataTAC, and ReFLEX was their ability to accept MT data connections. Mobitex, DataTAC, and ReFLEX networks were principally designed to support two-way paging-like features, including portable wireless devices carried on one's person like a one-way pager and as such, these networks supported devices that firstly supported incoming MT data. For the cellular wireless and GPRS networks, including Universal Mobile Telephone Service ("UMTS") networks, data transport was an afterthought (or late addition) and receiving incoming data connections was not generally supported by the networks for the vast number of devices that operated or will operate on the wireless networks. Short Message Service ("SMS") connectivity was one of the first types of MT data supported by the vast majority of wireless mobile devices that were created first and foremost for voice services.

The methods of receiving, accepting. and acting upon incoming data connections are many. Almost all current methods are very slow or very expensive in terms of network resources. One method currently used almost exclusively for IOT devices involves sending an SMS message to the remote wireless device and once received, the remote wireless device initiates an outgoing connection to the requesting server. Many people familiar with IOT and wireless networks know of this method as an 'SMS Shoulder Tap.' Another method supported by some IOT devices, but significantly less popular, is to place an MT voice call to the IOT device using its Mobile Station International Subscriber Directory Number ("MSISDN"). The data device does not accept the MT voice call, but instead uses this incoming call as a triggering event and subsequently initiates an outgoing IP connection to the requesting server. Both methods described are problematic and involve significant latency and require the initiating server to interface to disparate systems.

The GSM standards body, 3rd Generation Partnership Project ("3GPP") did not totally ignore MT data connections. These groups have specified methods to establish incoming connections to a wireless device. These methods are fairly straightforward, but the industry never contemplated the massive number of wireless devices requiring incoming data connections that exist, or will exist, in today's IOT environment. The method established by 3GPP involves using a public (Internet) fixed IP address, either an IPv4 or IPv6 address, for each IOT device. Several problems that were not anticipated by the standards committees have challenged network operators when attempting to use this solution.

One of the big problems with using publically addressable IP (i.e., a client device connected to the public internet can sent a message directly to an internet protocol address of an IOT device that may be connected to a private network) relates to the limited number of IP addresses available for use relative to the increasing number of devices that connect to the Internet, and thus need a publicly addressable IP address. Internet Protocol version 4 (IPv4) has the ability to support a maximum number of $2^{32}$ (4,294,967,296) unique IP addresses. By some accounts, address exhaustion occurred in 2011, and by other accounts, exhaustion will occur in 2015, or soon thereafter. Mobile networks in many countries have already started using Internet Protocol version 6, the successor protocol to IPv4. IPv6 uses a 128-bit address, thus allowing $2^{128}$ addresses. Unfortunately IPv4 and IPv6 are not designed to be interoperable, complicating the transition to IPv6 for both wireless devices as well as Internet systems. There are several IPv6 transition mechanisms to support interoperation, but there are no universal methods to bridge the networks. IPv6 essentially creates a parallel independent network requiring translator gateways that employ one of the transition mechanisms. In the past, some operators have offered (and may continue to do so) Subscriber Identity Modules ("SIM") with fixed, public IPv4 addresses, but the added cost and limited availability of unassigned addresses eliminates using fixed IPv4 addresses as a serious solution for the high number IOT devices that experts forecast will be 'Internet-connected' in the coming years and decades.

With the large number of IOT devices and with the user expectation of Internet like responses from those devices, and the need for remotely controlling WWAN connected devices, it is desirable to have a reliable and high speed method to re-establish a data session with a devices that may have already ended a session, but that remains attached. It is desirable to minimize unnecessary data flow between WWAN connected remote-devices if the purpose of the data flow is merely to support 'stay-in-contact' polling messaging that is used to maintain a data session that otherwise isn't transferring data. It is also desirable to minimize power consumed by the communications radio of IOT devices for maintaining 'stay-in-contact' polling.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts in a simplified form as a prelude to the more detailed description that is presented later.

In accordance with one or more of the embodiments, this disclosure presents a method for remotely establishing a data session to a GSM/UMTS or LTE device, or other device using similar signaling methods, said device being in a network attached state, without local user interaction directly at the communications device. It discloses a method for managing a remote connection to a GSM/UMTS or LTE device without first sending an SMS wakeup message and without having multiple API interfaces managing disparate wireless interfaces such as a Short Message Peer-to-Peer ("SMPP") interface and a IP packet data connection. Further, the description herein discloses a method for rapidly establishing a remote packet data connection on an IOT device without the uncertainty, latency, and unpredictability of using the SMS delivery network to trigger a device to perform a task.

As described above, WWAN devices have numerous attachment states, with some states permitting the device itself to communicate over an IP network to some predetermined IP endpoint in the wireless network. That endpoint is usually part of, or managed by, a sophisticated router, a GGSN in a GSM/UMTS network, or a Packet Gateway [PGW] in an LTE network. The GGSN/PGW acts as a firewall when the device connects to the Internet and it operates like a gateway when the device connects to a defined private network, for example, an enterprise network operated by a third party enterprise specifically for supporting the connectivity of the IOT device to the enterprise's own private servers.

When the WWAN connected device is connecting to the internet, the GGSN/PGW firewall translates the device access to the Internet in much the same way as one's home Digital Subscriber Line ("DSL") or Cable router translates the addresses for the personal computers in a home network. The GGSN/PGW acts as the anchor point for network mobility and acts as the interface point between the GSM/UMTS or LTE networks and other packet data networks such as the Internet or private enterprise networks. When interfacing to the Internet, the GGSN/PGW provides a stateful firewall, and provides Network Address Translation ("NAT") among other functions. With NAT, a WWAN-connected device's IP address is hidden behind the firewall and data packets originated from the Internet cannot be routed directly to a local subnetwork IP address of a WWAN-connected device.

Although enterprise connections don't necessarily need full firewall and NAT functionality similar to those that are required for Internet connected devices, there are limitations associated with WWAN devices that hinder anytime-IP, or always available, connectivity. The IP address of a WWAN device is typically a private address, and that private address is contained within a private managed network (sometimes referred to as a subnetwork) that is accessible only to the WWAN's devices and the enterprise servers that are part of the private network, but any of the WWAN's devices will typically be in a state of being disconnected from the packet data network when the device does not conduct ongoing data traffic (typically if not data traffic packets are transferred for more than a predetermined idle, or inactivity, period, the device transitions it data sessions and processes to a state of disconnect with respect to the WWAN.

Aspects disclosed herein may use two different processes, one specifically for GSM/UMTS devices and one specifically for LTE device for re-establishing a packet data session and to further route applicable incoming packet data traffic to the newly connected WWAN device, regardless of whether the IP address assigned to the new packet data session is the same as a previous packet data session of the WWAN device. Other novel advantages and novel features will become apparent from the following detailed description when considered in conjunction with the drawings, and the disclosed embodiments are intended to include all such aspects and their equivalents.

Aspects disclosed herein provide connectivity to a WWAN device containing a GSM/GPRS/EDGE/UMTS or LTE radio modem connected to a public wireless wide area network that is traditionally designed for connecting with the wireless network using wireless-device-originated methods, whether initiated by a user accessing an application, by a timer initiating the process, or by the detection of a change in sensor status or some other indication. Remote activation of remote wireless-network devices is haphazard and slow. Traditional activation typically uses an SMS message to alert the remote device to initiate a data connection to the packet network that is associated with the wireless network to accept incoming data. Aspects disclosed herein deliver IP messages directly to the WWAN device immediately without regard for the device's connectivity status/state or type of network it may be operating on, and without requiring the device to maintain an expensive and power consuming active data session, constantly pinging the network with useless keep-alive messages just to be able to maintain a data-connected state and to receive the periodic data messages, often separated by hours or days and without using the SMS service. Additionally, the disclosed aspects overcome limitations and expense of maintaining public fixed IP addresses of the UE devices (which may be smart phones, IoT devices, telematics devices in vehicles, wireless devices that are connected or coupled to sensor device, wireless-connected home appliances, etc.

BRIEF DESCRIPTION OF DRAWINGS

FIG. 1 illustrates a table that summarizes EMM, ECM and RRC states for an LTE device.

FIG. 3 illustrates various states of an LTE device and the user experiences corresponding to each of those states.

FIG. 4 illustrates a simple flat network where all devices connected to it can recognize, send, and receive messages to each other.

FIG. 5 illustrates a secure network tunnel that operates much the same way as a simple flat network. Each device on each side of the bridge can see the devices on both sides of the bridge. A device can send or receive a message to any other device without any special external interaction. Messages on the left side are copied to the right side and messages on the right side are copied to the left side.

FIG. 6 illustrates a secure routed network where each subnet has its own unique range of IP addresses. Each router maintains the IP address ranges and corresponding IP addresses associated with corresponding devices on its network, and appropriately routes messages that are sent to a destination that is not on its network to an external network interface, which passes the messages through the Internet to the target IP address and port number. The target IP address may be that of a router/firewall that forwards data addressed to a specific port on to one of a set of private-IP-addressed computers on the internal network at a specific (same or different) port.

FIG. 7 illustrates a high-level network architecture featuring a Public Access Secure Server ("PASS"). In an ideal embodiment, each external user is connected to the Public Internet and messages directed to the IOT device are sent to the PSGPAS, operated in a bridge mode over an established point-to-point VPN.

FIG. 8 illustrates the basic LTE data network architecture as operated by most wireless network operators.

FIG. 9 illustrates the basic GSM/GPRS/UMTS data network architecture as operated by most wireless network operators.

FIG. 20 illustrates a verified user equipment schema that may be used by a Pub-Sub platform operating as a PASS to establish a connection between a public-internet-connected initiator device and a private-network connected UE device based on information corresponding to the initiator device and a topic received from the initiator device.

DETAILED DESCRIPTION

Figure 2:
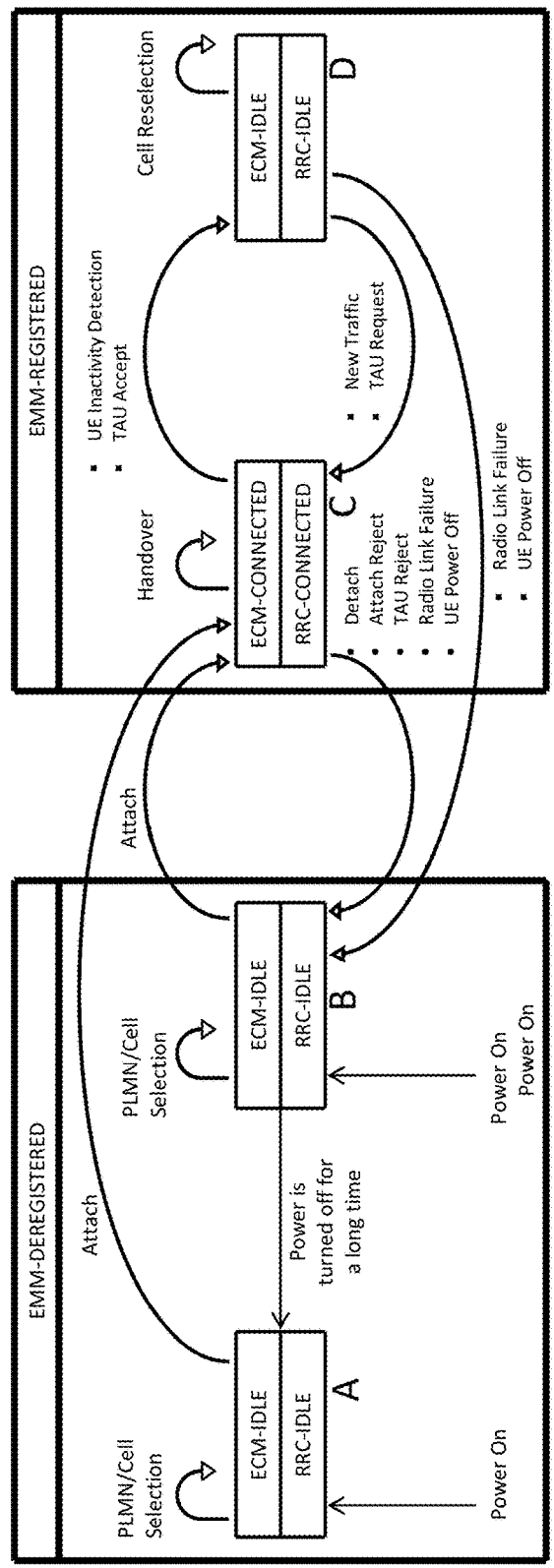
FIG. 2 illustrates a state table of an LTE device showing various EMM, ECM and RRC states

As a preliminary matter, it will be readily understood by those persons skilled in the art that the present invention is susceptible of broad utility and application. Many methods, embodiments, and adaptions of the present invention other than those herein described as well as many variations, modifications and equivalent arrangements, will be apparent from or reasonably suggested by the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

In the GPRS and LTE data worlds, an active data session is known as a packet data protocol ("PDP") context session or a Bearer Setup. As previously mentioned, a mobile device establishes a packet data session to a specific endpoint. The specific endpoint is a gateway/firewall to get to the broader public Internet or it may be to a gateway/firewall to an established enterprise IP connection. Generally speaking, a PDP context is established to a Gateway GPRS Support Node ("GGSN") for GSM and UMTS networks or, in the 4G/LTE network, an Evolved Packet System ("EPS") Bearer Setup is established to a Packet Data Network Gateway ("PGW").

For a UMTS or GSM device, the network data session is established with the PDP Context Activation procedure. But, before the PDP context can be established, a User Equipment ("UE") device must do an Attach procedure. The Attach procedure is used to alert the Serving GPRS Support Node ("SGSN") and subsequently the HLR/HSS that the UE has powered up. There is not much the UE can do after an Attach without requesting a PDP context. But, the UE is available to receive an SMS or a Network Initiated PDP Context. Currently there are not many operators supporting SMS over the packet network and almost no operators support Network Initiated PDP Context because there are not established methods to request the Serving GPRS Support Node ("SGSN") to generate a Network Initiated PDP Context without using a predefined public static IP address assigned to the given UE device.

Normally a UMTS or GSM device will complete the Attach procedure and immediately initiate a PDP Context Activation that will establish the data session and network tunnels, and allocate an IP address to the UE. The UE will retain the IP address as long as the device continues to transmit or receive data from the GGSN, but as soon as the data stops flowing, after predetermined inactivity timeout period, typically about an hour, the SGSN or GGSN can terminate the PDP context. The UE can also send a Deactivate PDP context to the SGSN and terminate the session at any time. Once the PDP Context is deactivated, as is the normal operation currently, the UE must reinitiate the PDP Context activation procedure.

For a LTE based system, there are two types of data session setups. The first is called a Default EPS Bearer. The second is the Dedicated EPS Bearer. The Default EPS Bearer is established as part of the Attach procedure. When a UE application needs to establish an application data service, a Dedicated EPS Bearer will need to be established. The LTE Attach/Default EPS Bearer is the equivalent of the UMTS Attach. One major difference is that the default bearer in LTE comes with an IP address where a UMTS or GSM Attach does not assign an IP address. The LTE Dedicated EPS Bearer setup is similar to the PDP Context Activation.

For UMTS or GSM, the IP address is not assigned until the UE initiates a PDP Context Activation. In LTE, the default bearer, and hence the IP address of the UE on the default bearer, both remain as long as the UE is attached. For UMTS or GSM, the IP address disappears with the loss of the PDP Context, which happens due to inactivity, typically after about an hour of inactivity. For LTE, the IP address remains as long as the device does not specifically detach from the network for one of several of reasons. For GSM/UMTS and LTE devices, the only way to maintain a PDP Context or dedicated bearer for application data is to continue to pass data between the UE and the GGSN or PGW.

Although the above paragraphs provide a simplified description of LTE connection states, more details are discussed below. No attempt is made herein to teach the complete details of the aforementioned GSM/UMTS and LTE wireless network specifications, but enough details are discussed below to provide a framework for discussing aspects and embodiments disclosed herein.

LTE devices have numerous operating states and functions for describing the attachment of UE to the network. Some of those functions are part of the Evolved Packet System ("EPS") Mobility Management ("EMM") functions; some of those functions are part of the EPS Session Management ("ESM") functions.

EMM connection management is performed through the EPS Connection Management ("ECM") function, and an ECM connection consists of a Radio Resource Control ("RRC") connection over a radio interface and signaling connections over network interfaces.

To better understand the operating states of a given UE operating in an LTE environment, each of the states is shown in the table of FIG. 1. At the simplest level, RRC has two states, RRC-IDLE and RRC-CONNECTED. Simply put, RRC-IDLE is the state when no radio interface connection is established yet and RRC-CONNECTED is when the radio has established signaling connections with the wireless network. At power-on, a UE moves from RRC-IDLE to RRC-CONNECTED. Radio resources facilitate communications between the UE and the network. Without radio signaling connections, the ECM connection cannot be established.

Examining the table of FIG. 3, the network functionality and user experience at the UE is described at each state of operation. Case A is the condition immediately after the UE is powered-on after a long period of being powered-off. The radio interface connection in the UE is idle and no ECM connection can be established until the RRC-CONNECTED state is reached by the radio interface. In this initial state, the user cannot send or receive any data. Normally, if a radio network is available, the phone searches the airwaves and finds this radio network very quickly and moves to Case C.

Continuing on the table of FIG. 3, with Case C, the UE attaches to the network and establishes a default bearer and performs a tracking area update and establishes a dedicated bearer if a UE application requires the dedicated bearer to pass specific data. The device itself manages the mobility of the device. As long as the device remains within the defined tracking area, as currently established with the network, no specific network level communications are required. The tracking area can be as small as a cell or as large as a city, for example, depending on how the network operator defines it. User data can be passed between the network and the device. As noted in the table, this state is the EMM-REGISTERED state.

From the table of FIG. 3, Case D is the condition when the network, the UE, or the application, do not have any data to pass in either direction. After sitting idle for some period of time, usually on the order of an hour, the radio interface connection will drop to idle and without a communications path, the ECM moves to the idle state. As long as the device does not move beyond the tracking area as determined by the UE listening to the eNodeB data channel, the UE can remain in this state. While in this state, the UE remains attached but can not pass data traffic in either direction.

To move from Case D back to Case C, one of three events must happen. As mentioned previously, the device can travel out of the tracking area. The device itself recognizes the change in the tracking area and moves the UE to Case C to begin a Tracking Area Update ("TAU") procedure. The TAU procedure updates the Mobility Management Entity ("MME"), which is responsible for managing the network side of the device mobility. Also, as previously mentioned, an application on the UE may ask for a data connection and once this application initiates the data request, the UE will transition to Case C. The third event that can force the device back to Case C from Case D occurs when the MME generates network signaling to the UE. The network signaling could be because of an incoming voice call, an incoming SMS, or an incoming data packet.

Although transitioning between Case C and Case D is important in the management of the device mobility, transitioning back to Case A or Case B is generally less relevant to aspects disclosed herein.

Turning to FIG. 2, once the power-on condition initiates UE processes, the UE "ATTACHES" to the network. The radio signaling connections are established and ECM connections are established. The ECM-CONNECTED state is when Non-Access Stratum ("NAS") signaling connections are established on the radio communications link. The UE has been assigned physical resources, radio resources and network resources. Upon transitioning to the RRC-CONNECTED/ECM-CONNECTED state, the UE will be considered EMM-REGISTERED when the default bearer is established, an IP address is assigned to the UE, and the network knows the current location (as defined by the tracking area) of the UE.

As long as the UE continues to transmit or receive data messages, then the device will remain in the ECM-CONNECTED/RRC-CONNECTED state. After some period of UE inactivity, the UE moves to an ECM-IDLE/RRC-IDLE state. This state, although seemingly similar to the state prior to power-on at Case A or Case B, is different in that the device actively monitors the network and reselects new cells as required to maintain reception of a cell data channel.

Basically, the UE is "ATTACHED" (or EMM-REGISTERED) and waiting for either new data traffic, whether it is mobile originated ("MO") or MT data traffic. The UE is also monitoring the tracking area, which is a cell or group of cells, as assigned and defined by the network during the ECM-CONNECTED/RRC-CONNECTED state, for a change to another cell outside the tracking area. It is important that the UE detect the change and notify the network of its new location so that the device might be "signaled" for an incoming call, incoming SMS or network originated data session. If the UE detects new on-board application data traffic or it changes itself to a cell outside of the network defined tracking area, the UE will move to the ECM-CONNECTED/RRC-CONNECTED state (Case C). Once in the ECM-CONNECTED/RRC-CONNECTED state, the UE will update the network with its new location and the UE will synchronize with the network on a new tracking area. A UE device in a static location could potentially remain in the ECM-IDLE/RRC-IDLE state and EMM-REGISTERED for an indefinite period of time.

Any time a UE, in the aforementioned EMM-REGISTERED mode, begins a power-off procedure or it encounters a radio link failure, the UE returns to the EMM-DEREGISTERED (or UNATTACHED) mode.

The most important part of the description above relates to the EMM-REGISTERED mode and the transition from ECM-CONNECTED to ECM-IDLE states. Repeating the description above, the UE moves from ECM-CONNECTED state to ECM-IDLE state based on UE data inactivity. The UE moves from the ECM-IDLE state to the ECM-CONNECTED state based on new data activity.

Similar to the UMTS/GPRS Network Initiated PDP context, LTE supports a network initiated "connection" transitioning UE from the ECM-IDLE/RRC-IDLE state to the ECM-CONNECTED/RRC-CONNECTED state. This transition can only occur if the UE is already EMM-REGISTERED. In order to initiate the transition of states in the UE, the PGW initiates network traffic to the UE, via another node, the Serving Gateway ("SGW"), which is a data node similar in function to a SGSN in a GSM network, where the SGW node kicks off the connection process if the UE is not already in the ECM-CONNECTED/RRC-CONNECTED state. Once the SGW receives the specific data packet destined to the UE, if a link is not established to the UE via the Evolved NODE B ("eNodeB") (this is the LTE cell site radio equipment), the SGW communicates with the Mobility Management Entity ("MME") to generate the appropriate NAS messages to the eNodeB to establish the RRC connection with the UE. Once in the RRC-CONNECTED state, the UE can transition from the ECM-IDLE state to the ECM-CONNECTED state (i.e., the UE has established a connected state for purposes of communicating data), a dedicated bearer is established, and the data packet can be delivered to the UE.

The LTE UE normally establishes the RRC connection when the end-user starts an application to browse the Internet or sends an email. Similarly, the LTE UE establishes an RRC connection if the UE moves into a new Tracking Area and has to complete the Tracking Area Update. The network triggers an RRC connection by sending a NAS paging message. This is typically used to allow the delivery of an incoming SMS or notification of an incoming voice call. The paging message is transferred on a Common Control Channel ("CCCH"), which is broadcast over all eNodeB sites within the Tracking Area if the RRC connection is not established.

In the LTE environment, a dedicated bearer is requested (and assigned) to a UE whenever the UE needs a dedicated tunnel for one or more specific traffic types or applications. For example, application data, VoIP, Internet traffic, or video services need to provide a better user experience than the default bearer can support, which does not guarantee a bit rate or quality of service. However, dedicated bearers can provide special treatment for specific services by providing a guaranteed bit rate where the default bearer cannot provide that dedicated bit rate. Dedicated bearers can provide separation between IP Multimedia Subsystem ("IMS") network traffic, the wireless network function that provides voice and SMS services, and routine Internet traffic. The dedicated bearer is normally linked to a default bearer and can have the same IP address as the linked default bearer.

It is noted that the IP address assigned to the UE is never used within the wireless network as an address to which a device outside the wireless network can forward traffic packets, regardless of whether the technology is LTE, UMTS, or GPRS. The IP address of a UE is available only by the PGW or GGSN. The PGW or GGSN acts somewhat like a default gateway for the UE, to make an analogy with the traditional IP world.

Based on previous details of the existing GSM/UMTS or LTE systems, one skilled in the art can clearly understand that devices are currently designed to operate, in a general sense, in a DATA-CONNECTED and a DATA-DISCONNECTED state. Without data traversal between the UE and the network during a predetermined period, the UE moves to a DATA-DISCONNECTED state after the period elapses. While operating in the DATA-DISCONNECTED state, the UE device consumes significantly lower power, advantageously uses less network resources, and consumes less data than when it is operating in the DATA_CONNECTED state. Having the network force the UE into a DATA-DISCONNECTED state immediately after communications are completed, or having the UE move itself to the DATA-DISCONNCECTED state after communications are completed, aspects disclosed herein of initiating a DATA-CONNECTED state from the network side (i.e., from a public communications network that is coupled to a private network operated by a IOT operator), provides a significant advantage to IOT operators. With lower power consumption that aspects disclosed herein can provide, new battery powered devices and applications can emerge. Additionally, extending and coordinating Discontinuous Receive ("DRX") parameter values between the UE and the device can extend standby time of low power battery devices. Further, the details show that methods currently exist for the network to initiate a connection to transfer the UE to the DATA-CONNECTED state. However, what does not exist, as disclosed in the SUMMARY above, is an efficient, fast, and serviceable method to trigger the network connection from a device connected to the public Internet without the IOT wireless device to be contacted having a static public IP address (i.e, without having an IP address available to devices connected to the public network). Aspects disclosed herein use network-initiated messages to move the UE to the DATA-CONNECTED state from the DATA-DISCONNECTED state. Various embodiments can trigger the network processes for delivering the kind of instant connectivity that is desired by IOT users.

Aspects provide an on-demand connection to a wireless device without the device that is requesting the connection having access to a static public IP address of the device to which it is requesting a connection. Aspects provide a method for connecting a designated initiating IP station to a specific device of a private, managed network thru a Public Access Secure Server ("PASS"). The initiating IP station communicates to a publicly available IP address, or URL, of the PASS preferably by implementing a virtual private network tunnel for creating a secure point-to-point connection. The PASS and the IP station will preferably authenticate each other using pre-shared secret keys, certificates, or username/passwords or other future security schemes.

The point-to-point connection is capable of traversing the network address translators ("NAT") that may be used by a firewall of the wireless operator's private network, which includes the IOT device to which a connection is sought, and any NATs that may be used in the public network that includes the initiating IP station. Upon receiving a packet sent from a UE to an initiating IP station, a network "filter-router" of the PASS examines the destination IP address of the packet to determine if the IP address is one which is a member of the initiating IP station's group and if not, the packet is dropped. If the packet is part of the initiating IP station's group, the packet is forwarded to the initiating device on the Internet using standard Internet "return packet" routing techniques.

For purposes of connectivity in a DATA-CONNECTED state for a GSM/GPRS/UMTS UE or an LTE UE, a fixed IP address is assigned to each IOT UE that is part of a private network. Since public fixed IP addresses using IPv4 addresses are nearly impossible to allocate to new devices because the addresses have almost been exhausted, these IP addresses are preferably IPv4 addresses in a private address range preferably from 10.0.0.0 to 10.255.255.255, but the address range could be any public or private IP address range. Selecting an IPv4 address means that an initiating computer could operate using a standard IPv4 stack and standard IP techniques. If an IPv6 address is selected for the UE on the wireless/private network, either the initiating computer would need an IPv6 stack to operate with an application and techniques that support IPv6 or the PASS would need to translate the IPv4 established connection and packets from the initiating computer into IPv6 protocol IP packets. If the range described above is selected, the method and system described in this preferred embodiment could support over 16 million (~16,777,216) unique UE IOT devices. In a tunneling VPN environment, initiator IP stations/devices also typically have an IP address associated with them, either permanently assigned or temporarily assigned using a DHCP assignment, from among the address range of the same allocations as the IOT UE.

The PASS disclosed herein establishes at least one public/private APN for IOT devices. It may be public insofar as many users, even millions of users or IOT devices, are able to share the use of a single APN of a WWAN, or other private, network. An APN is normally a defined endpoint in the GGSN or PGW where mobile connections terminate in the wireless network. Instead of a connection to the Internet, like a public APN, or to a private enterprise like a private APN, this public/private APN will connect to the VPN PASS. Private APNs are much like VPNs from a security perspective, providing security between devices and networks. Normally, each enterprise has separate and unique APNs that are used only by UEs that connect to that enterprise's network. Other UEs connect to either the public APNs or to other private APNs. In this embodiment, many UE devices spread across many enterprises and individuals share a single APN, but are preferably separated using their own software based VPN client resident on each of the UEs, and they are separated thru routing controls and limitations between initiating IP stations and UE IP address. Further, the UE devices themselves are normally (but optionally) configured so that they may not access another UE device address or third party initiating IP station, and are also separated because of routing controls and limitations between the UE IP address and the destination IP address of an IP initiator.

In an aspect shown in FIG. 7, system 700 includes one or more initiating IP station(s) 702 that are, connected to the public Internet 704, either directly, with a public IP address or behind a NAT/firewall. Each of the initiating IP stations shall have client VPN software that can establish connectivity to a public IP address of PASS 706. To connect to PASS 706, preferably, a Client initiating device 702 will use VPN client protocol to establish secure connections 708 with a VPN Server protocol that is part of the operating software of PASS 706. It will be appreciated that other types of secure communication connections 708 can be used instead of VPN tunnels. In addition, each of connections 708 may be different from each other. As is standard and customary with secure point-to-point connections, a server of PASS 706 authenticates with the client and the client authenticates with the PASS server, preferably using a pre-shared secret key, certificate, or username/password, or any other future technology used for encryption and authentication management. Once authenticated, if a tunneling mode VPN connection 708 is used, a virtual IP address of an initiating IP station/device 702 for the tunnel toward the UE will typically be assigned from the aforementioned IP private address range of private network 712, preferably within the range of 10.0.0.0 to 10.255.255.255, which notably may be the same address range as the UE IOT device 710 is assigned in the DATA-CONNECTED state.

When referring to LTE network architecture, the Carrier External Interface ("CXI") is named the SGi interface. Specifically, the SGi Interface is the normal demarcation point at the PGW between the external public network 704 and private packet data network 712. When referring to the GSM/GPRS/UMTS network architecture, this CXI interface is known as the Gi Interface.

Turning to FIG. 8, a basic LTE packet data core network architecture 800 is shown. The external connection from public Internet 801 to the LTE packet data core 802 is through the PGW 804 by way of SGi interface 806. A network translating device, such as a PASS, is not shown between network 801 and private IP network 808 in FIG. 8.

FIG. 9 shows a basic GSM/UMTS packet data core network architecture 900. The external connections of public Internet 901 to the GSM/UMTS packet data core 902 is through Gateway GPRS Support Node ("GGSN") 904 by way of the Gi interface 906. A network translating device, such as a PASS, is not shown between network 900 and private IP network 908 in FIG. 9.

Figure 10:
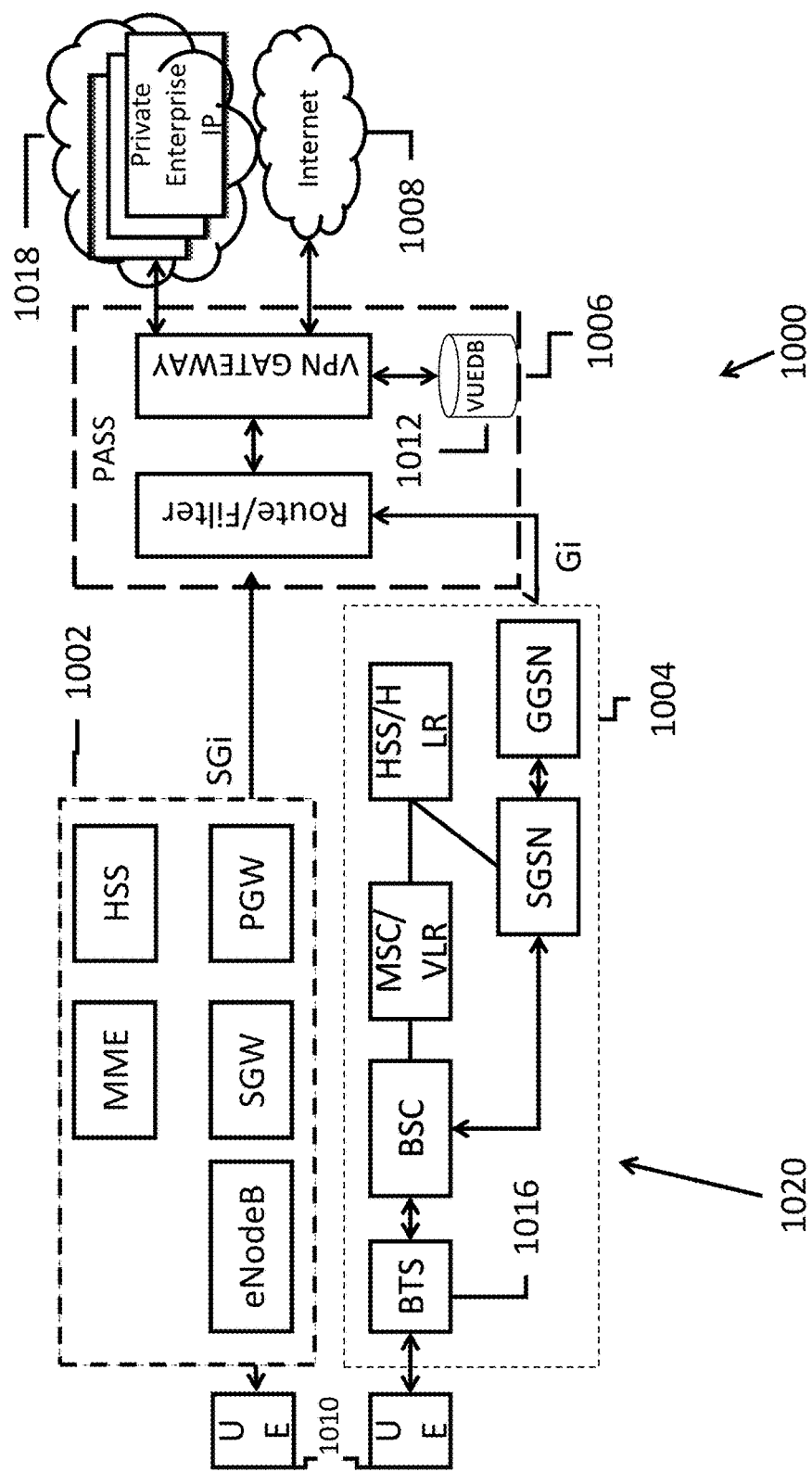
FIG. 10 illustrates detailed system diagram with a PASS integrated with wireless communication network infrastructure components, a public internet and a private internet.

FIG. 10 illustrates a system 1000 that implements a combination of two different packet data core networks 802 and 902. which are referred to in FIGS. 8 and 9, respectively. It will be appreciated that typically a long-range wireless carrier that supports both types of wireless data networks combines some of the functionality into the same component, or components to reduce unnecessary duplication. Generally, in a real-world combined network, the interfaces between the elements of networks 802 and 902 might be to a PGW in an LTE network or to a GGSN in a GSM/UMTS network. Although some of the network elements are typically shared in a real world embodiment, for simplicity, system 1000 separately illustrates discrete components of an LTE network 1002 and a GSM/UMTS network 1004 coupled to a single PASS network translating device, or translating server, 1006, as disclosed herein.

PASS 1006 manages IP traffic between an initiating IP stations/devices that are part of public IP network 1008 and the UE devices 1010, and limits connection access and connectivity from devices of network 1008 to only IP addresses in an IP address range specified in a Valid UE Database ("VUEDB") 1012, which is preferably part of PASS 1006. It will be appreciated that although UE devices/IOT devices 1010 are shown connected to eNodeB 1014 or BTS 1016 because these components provide physical connections between wireless devices 1010 and data packet cores 1002 and 1004, respectively, the private addresses that the VUEDB contains are addresses that are valid addresses of servers of one or more private networks 1018.

VUEDB 1012 contains data associations used to control data packet accesses, or flows, in both directions (i.e., from a device of private network 1008 to a UE device 1010, or from a UE device to a device of network 1008. For example, if a UE initiates an IP packet flow, PASS 1006 typically will only allow the packets of the flow to traverse to an IP address (or SSL destination instance) defined in VUEDB as corresponding to an IP station that is part of a specified group of allowed IP initiators (i.e., part of a private network 1018) that are allowed to initiate an IP session to the UE as established in the VUEDB. If an IP initiator, as identified to PASS 1006 by its credentials used to establish the connection to the PASS attempts to access any other IP address outside the range of the permitted IP addresses as defined in the VUEDB, the PASS shall not deliver those packets. The undelivered packets may be dropped without notification or it may be rejected with an error indication, but preferably it will not be delivered to a receiver not permitted according to the VUEDB. If the packet destination address of a packet sent from an IP initiator is within the range permitted by the VUEDB, then the IP packet is bridged, routed, or otherwise delivered to the appropriate UE by way of the SGi or Gi interface, as shown in FIG. 10, via the GGSN or PGW connection from the PASS.

Figure 11:
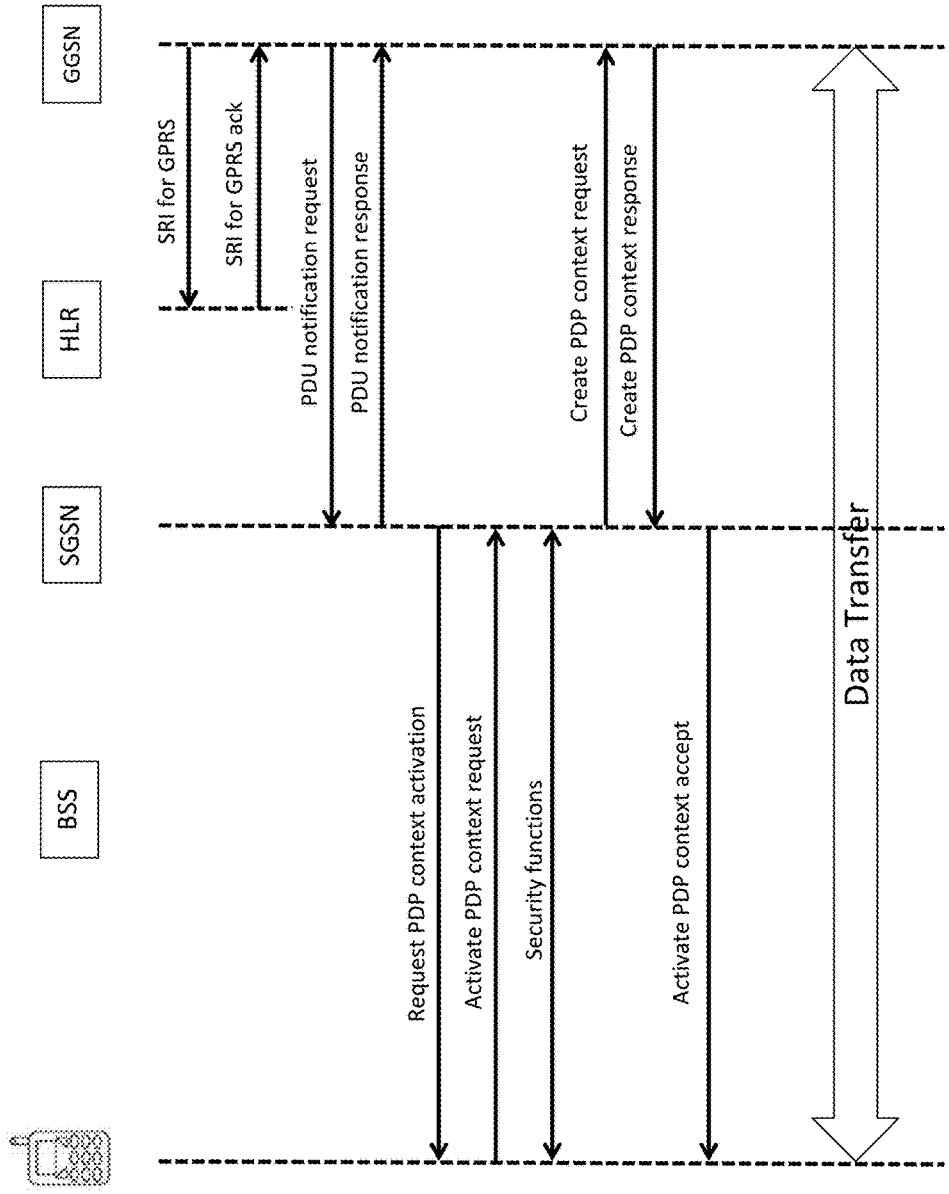
FIG. 11 illustrates a ladder diagram that highlights a connection setup for a network initiated packet data connection for a GSM/GPRS/UMTS device that does not have an active PDP context.
Figure 12:
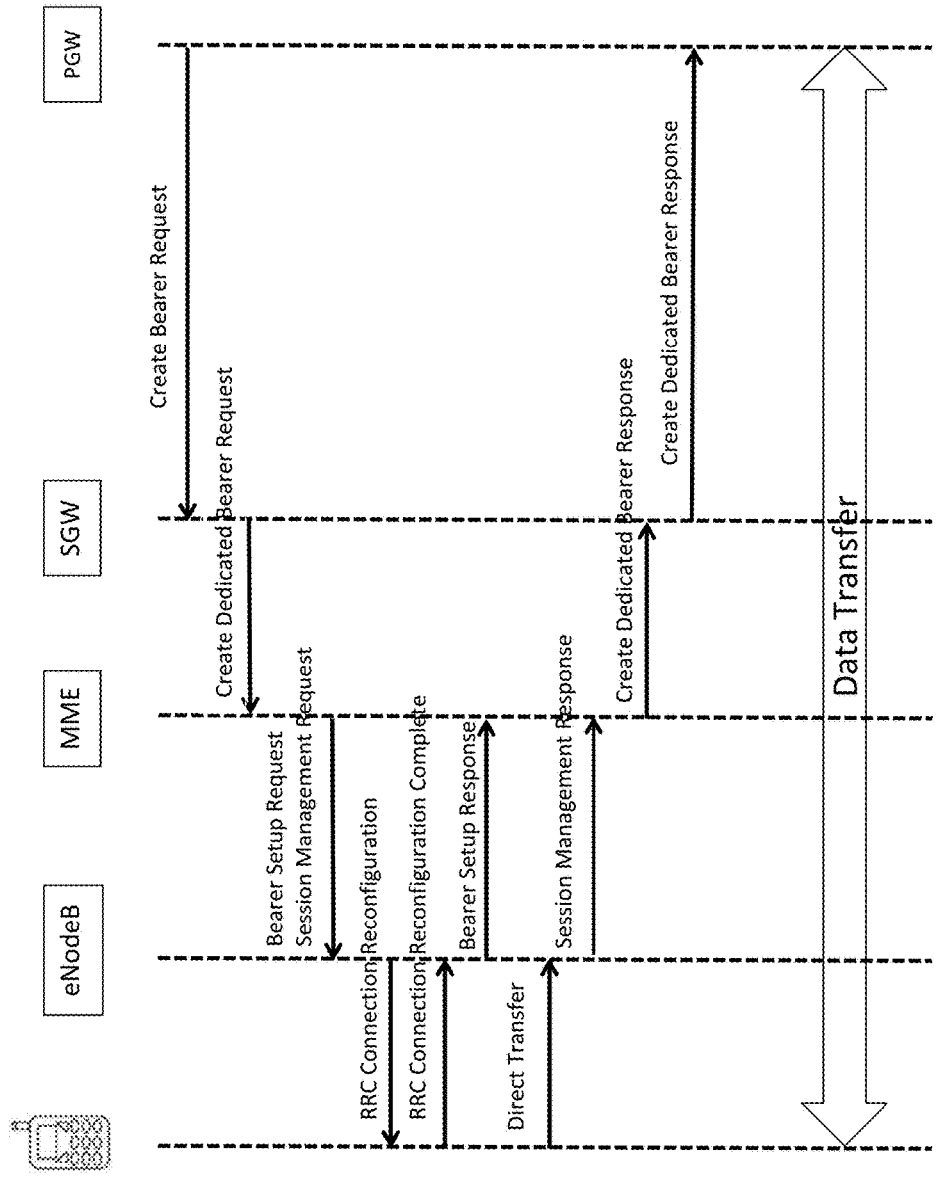
FIG. 12 is a ladder diagram that highlights a connection setup for a network initiated packet data connection for an LTE device that does not have an active EPS Dedicated Bearer Setup.

The GGSN/SGSN or PGW/SGW examines the connection state of UE 1010 as identified by the destination IP address of the packet received at the SGi or Gi interface, from PASS 1006 and sent towards the wireless network environment 1020 to be delivered to UE 1010. If the connection of UE 1010 is not in the DATA-CONNECTED state, the appropriate node (either SGSN or SGW) typically will initiate network connection request thru the appropriate network nodes (i.e., nodes corresponding to either LTE network 1002 or GPRS/UMTS network 1004. FIG. 11 shows the connection request flow thru the GSM/GPRS or UMTS network. FIG. 12 shows the connection request flow thru the LTE network. Regardless of the type of network UE 1010 is connected to, the UE will receive a paging message and move to the DATA-CONNECTED state (e.g., an ECM-CONNECTED state in an LTE network). Once UE 1010 moves to the DATA-CONNECTED state, the packet flow is delivered to the UE.

The methods of connecting a client or initiating IP station to the PASS are many. Aspects disclosed, herein, however, do not necessarily depend on the mechanism that devices connect to PASS 1006. Rather, aspects disclosed herein are designed to eliminate the need for the nearly unsupportable situation that the IOT industry finds itself in of trying to obtain static public IP addresses for the millions, and more, of UE devices that users seek to use within networks, such as private enterprise networks 1018 as shown in FIG. 10. PASS 1006 includes at least one public static IP address or URL that provides a point for a client initiation device seeking to establish a connection to an otherwise unreachable (because it does not have an assigned static IP address of public internet 1008) device that is part of private enterprise IP network 1018. Aspects may create a nearly invisible bridge between the public Internet and the specific wireless UE that do not have the encumbrances of custom Application Programming Interfaces, while retaining the security, isolation, and control that might be expected for a modern M2M deployment.

Turning now to FIG. 4, the figure illustrates a simple IP network 400 in which each device of devices 402 are addressable from all other IP devices of the network. Network 400 is a relatively flat network and is the ideal solution for M2M UE connectivity. Even in the Internet network, this resembles the most desirable connectivity example though many intermediate routers and switches are in-between peers. If the solution added adequate security technologies on top of the connection, limiting unwanted connection attempts from unauthorized third parties, this would be a nearly perfect architecture. Unfortunately this solution would require a static public fixed IP address for both an M2M UE of network 400 and an initiating IP station of the network.

FIG. 5 shows a network system 500 with a VPN tunnel 502 carrying traffic between separate networks 504 and 506. Packets transmitted by a device 508 on the left side network 504 may be bridged, or sent out, by tunnel 502 to a device 510 on right side network 506. Likewise, tunnel 502 may send packets to devices 508 of left side network 504 that were sent from a device 510 of right side network 506. IPSec VPNs are example of this type of tunneling solution represented by tunnel 502. IPSec VPNs can protect IP packets exchanged between the remote networks 504 and 506, or hosts 508 and 510. An IPSec gateway can be located at the edge of each of the connected networks 504 and 506 offering a site-to-site tunnel that may facilitate multiple hosts, or initiating IP stations, having access to multiple wireless UE devices within a private wireless network. (For example if network 504 represents the public Internet and network 506 represents a wireless-implemented, private enterprise network, after being established tunnel 502 can securely transmit a data packet sent from a device 508 having IP address 10.15.16.25 to a device 510 having IP address 10.15.16.27.)

This aspect is ideal in a scenario where an initiating station 508 may typically request access to numerous UE devices 510. IPSec VPNs generally can support all IP-based applications. To an IPSec VPN tunnel, all IP packets are the same. However, an IPSec VPN tunnel may be cumbersome for protecting single applications or providing limited connectivity that might be typically required for a single M2M application. Installation of an IPSec VPN in a client initiating IP station computer is difficult and sometimes must be compiled into the initiating device's operating system. Thus, an IPSec VPN is only one example of a VPN tunnel and it is shown for illustrative purposes. An SSL/TLS tunnel, any other secure tunnel technology, or direct connection, could be implemented to provide similar results of providing a secure connection between an initiating station 508 having IP address 10.15.16.25 that may be part of network 504 and a target UE IOT device 510 having IP address 10.15.16.27 that may be part of network 506.

Turning now to FIG. 6, the figure shows a system 600 that is based upon a client VPN embedded into an application at initiator IP station 608 having IP address 10.15.16.25. The client initiator IP station 608 could exist behind a firewall 610 using a NATed IP address, or the client initiator could be using a public IP address. Client 608 preferably initiates an IP connection using a standard security technology like Secure Sockets Layer ("SSL") or Transport Layer Security ("TLS"). SSL and TLS are standard security technologies for establishing an encrypted link between a client and a server, usually a browser and a web server. In order to establish a session, initiator IP station 608 may use special client software to initiate a secure IP session to a destination IP address, typically an IP address assigned to the firewall 612 protecting the remote, private environment 614.

In the example shown in FIG. 6, initiator IP station 608 initiates a session to IP address 172.16.25.27 port 443. IP address 172.16.25.27 is the static public IP address for the firewall 612 protecting the PASS 616. The packet initiated by initiator IP station 608 is forwarded from the local enterprise network 618, protected by Firewall/Router 610 identified as "A", to the Internet 620 where standard Internet routing rules route the packet to the Firewall/Router 612 identified as "B." The destination Firewall/Router 612 has routing rules that direct packets with a destination address of 172.16.25.27 and port 443 to be forwarded to an internal (internal with respect to network 614) host address of 192.168.0.25 and a port of 443. As per normal IP routing rules, inside the network of Firewall/Router-B the packet is modified to appear as if the message was originally sent to 192.168.0.25/port 443. As shown in the figure, PASS device 616 has been assigned a static IP address 192.168.0.25.

The client software of the initiator IP station 608 preferably contains an SSL or TLS networking API, or stack, that manages authentication, authorization, and certification for the data that is passed between the client initiator IP and the destination PASS server 616. The client software usually passes plain unencrypted data to the security stack for sending to the PASS remote server. This data can be any type of data, whether binary, text, HTML, etc.

Software at PASS server 616 contains similar software as the client device 608, but it also includes either a port listener or it manages an external port listener. The port listener waits for incoming data messages, generally from other computers, to establish secure TCP connections or to accept secure UDP data. Secure UDP data can be passed using Datagram Transport Layer Security ("DTLS"). The incoming data is authenticated, authorized, and certified by the SSL, TLS, or DTLS networking stack then it is passed to PASS application software for filtering and delivery.

The selection of the security software is based upon the needs of the users, capabilities and the ease of installation and ongoing use. One skilled in the art would recognize that there are many options when selecting a security solution for protecting data traffic between endpoints. The selections highlighted in this disclosure are based on preferences at the time of filing this disclosure. Security methods are constantly being challenged and subsequently updated based on discovered weaknesses. Security techniques are presented herein given for purposes of discussion and are not meant to foreclose use of other security methods and systems that may be available.

Figure 15:
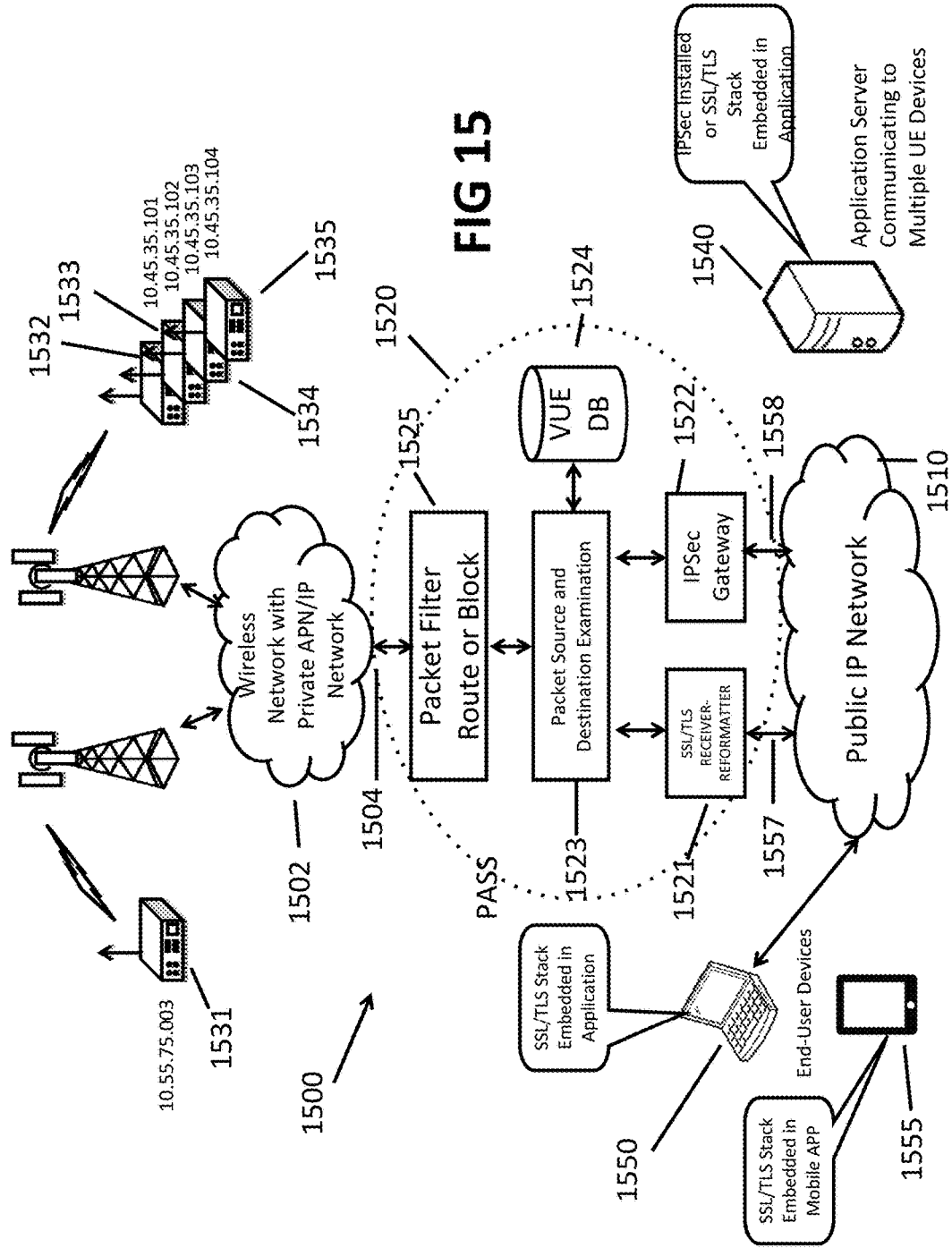
FIG. 15 illustrates a diagram of a networking system that uses a PASS without secure communication links with wireless UE devices.

Turning now to FIG. 15, the figure illustrates a system 1500 for establishing data packet flow from a device coupled to a public Internet to a device of a private network that shares a private APN with other private networks. Cloud 1502 refers to a WWAN network providing GSM/GPRS/EDGE/UMTS service, LTE wireless service, or any combination thereof. Connection of network 1502 to other networks may be made at private network connection 1504 Cloud 1510 refers to the public Internet. System 1520 refers to a PASS. PASS 1520 bridges Internet 1510 to one or more private networks that share a private APN of private WWAN network 1502. PASS 1520 interfaces to the WWAN network 1502 at point 1504, which may be the SGi or Gi interfaces of the PGW or GGSN, respectively, for the WWAN. Network interface connection 1504 is the demarcation point for a private APN associated with the wireless network 1502 and M2M wireless devices (UE) 1531, 1532, 1533, 1534 and 1535. Each of the UE devices is enabled to communicate on at least the single APN that terminates at point 1504.

Different initiating IP stations 1540, 1550, and 1555 are shown connected to Internet 1510, and may be connected to the Internet using any and all possible methods, including, but not limited to wired, WiFi wireless, WWAN wireless, with a direct static IP address, with a NATed IP address, directly, behind firewalls, and any other possible technology that permits IP packets to flow to and from the initiating device to other nodes on the Internet or other private, semi-private, or public network. An aspect facilitates computers of Internet 1510 to connect to, and initiate data sessions instantly with, otherwise unreachable wireless UE devices of WWAN 1502. Device 1550 and device 1555 are individual user interface devices that can include laptop computers, desktop computers, smart phones, tablets, wrist mountable computers, vehicle mounted computers, M2M devices or any other device that could possibly send or receive IP data packets. If the device 1550 or device 1555 needs to access one or a small number of devices 1531, or is encumbered by limitations in the operating system, or is encumbered by software access rights, the security software preference might be SSL or TLS since SSL or TLS could be easily installed in "user space" of the operating system of device 1550 or 1555.

In another example, if device 1540 seeks access to devices 1532 through 1535, the security software preference might be IPSec because the interface between the device 1540 and network 1502 is a tunnel and devices 1532 through 1535 would be easily addressable by using their respective IP addresses. Alternatively device 1540 could use traditional SSL/TLS but the access methods may be different and possibly more cumbersome than using IPSec.

To alleviate the burden that using SSL/TLS might impose, initiating device 1540 may store multiple security credential/information sets, wherein each credential set uniquely corresponds to one of devices 1531-1532. If initiating device 1540 seeks to communicate with, and initiate action by, device 1533, for example, an application running on the initiating device would automatically select a credential set associated with device 1533. Not only would this selected credential set be used to establish the SSL/TLS session with PASS 1520, but the PASS would use the credential set to determine where to send incoming packets from initiating device 1540 (i.e., the PASS determines IP address 10.45.35.102 as the destination address of packets coming from the initiating device based on the credentials used by the initiating device to establish the secure communication path through SSL/TLS Receiver-Reformatter 1521 of the PASS).

In an aspect, individual user devices 1550 or 1555 generates messages that are directed to M2M, or IOT, UE device 1531. Application software within the device 1550 or 1555 preferably contains user-space SSL or TLS stacks that are integrated into the application itself, even if the initiator device 1550 or 1555 does not have administrative privileges. In the Internet Protocol Suite, TLS and SSL encrypt the data of the network connection at the application layer. In OSI model equivalences, TLS/SSL is initialized at layer 5, the session layer, and TLS/SSL operates at layer 6, which is the presentation layer. TLS/SSL protocol operates on behalf of the underlying transport layer, whose segments transport encrypted data.

Packets from initiating device 1550 or 1555 arrive at SSL/TLS Receiver-Reformatter 1521 of PASS 1520 at a public network connection 1557 and the packets are identified by session credentials shared by device 1550 or device 1555 during a handshaking procedure with the PASS. There are numerous methods that can be used for key exchange/agreement including pre-shared key, certificate credential exchange, and Secure Remote Password. However, some methods don't authenticate both the client and the server, therefore they are not preferable because without identifying and certifying the client (which is the initiator IP station 1550 or 1555 in the example), it would be difficult for PASS 1520 to positively identify and restrict packets only to a specific wireless UE 1531-1535 that is/are associated with the initiator IP station device. It is possible to pass the UE device ID encapsulated once the session is set up, but this is undesirable and generally insecure unless the client (i.e., device 1550 or 1555 in the example) is authenticated. During the handshaking procedure, Receiver-Reformatter 1521 communicates with Verified User Equipment Data Base ("VUEDB"), which contains certificate, pre-shared key, password information, or similar credential information that uniquely corresponds to initiating device 1550 or 1555. (As discussed above in discussion of initiating device 1540 using SSL/TLS, initiating devices 1550 and 1555 may store multiple sets of credential information, with each set uniquely corresponding to one of M2M/IOT UE devices 1531-1535, and with the set being sent by initiating device being associated in VUEDB with the UE device that the initiating devices seeks to communicate with.)

Receiver-Reformatter 1521 extracts identification information for the source and destination from VUEDB 1524 based on credentials in one or more packets received during the session (or during session set-up) from initiating device 1550 or 1555. The destination information may include a private IP address within the one or more private networks served by the APN of WWAN 1502. Or, instead of an IP address, the destination information may include a label or name, such as a URL or a URI, that uniquely corresponds to one of M2M/IOT UE devices 1531-1535. Receiver-Formatter forwards the packet(s) with the source information (of the initiator station device 1550 or 1555 in the example) and destination information to the Packet Source and Destination Examination Element ("PSDEE") 1523. The PSDEE examines the packet, the source, and destination information, and determines/validates whether the destination information corresponds to a valid UE peer 1531-1535 of the source initiator IP station 1550 or 1555. If so, a private IP address that corresponds to the destination information is retrieved from the VUEDB. The VUEDB can be pre-provisioned with the private IP address of UE 1531-1535, or the private IP address of the UE can be set up dynamically during an initial communication from the M2M/IOT UE device when the device is first placed into service with the APN of WWAN 1502. After PASS 1520 has determined that a packet is valid (or has determined the packet to be invalid), the Packet Filter Route or Block element 1525 forwards the packet to the SGi or Gi interface at connection 1504, or the packet is dropped if it was deemed to be invalid. Return packets are delivered back to the original source initiating IP station 1550 or 1555 through the SSL/TLS networking stack.

Continuing discussion of FIG. 15, another possible initiating IP station is an Application Server 1540 that might need to communicate with multiple UE devices 1532-1535. Each of these UE devices are part of the group assigned to the Application Server in the VUEDB table. Application Server 1540 could use a TLS/SSL stack embedded into an application or associated with an application, but as discussed above this could be undesirable for initiating devices that need to access multiple wireless UE devices. Since, according to aspects disclosed herein, TLS/SSL credentials would be used not only to set up a secure communication session between initiator device 1540 and PASS 1520, but also to identify the destination wireless UE device, it might become necessary to embed UE identification into the TLS/SSL packet itself as user data. Though this technique might be workable, it is cumbersome for addressing numerous devices. For initiating device 1540, for example, to address multiple UE devices 1531-1535, a more desirable implementation might be to use IPSec security with an IPSec stack installed either at the initiating application server 1540, or installed at a firewall/router associated with it.

Internet Protocol Security (IPSec) is a protocol suite for securing Internet Protocol (IP) communications by authenticating and encrypting each IP packet of a communication session. IPSec includes protocols for establishing mutual authentication between peers at the beginning of the session and negotiation of cryptographic keys to be used during the session. IPSec can be used in protecting data flows between a pair of hosts (host-to-host), between a pair of security gateways (network-to-network), or between a security gateway and a host (network-to-host). IPSec uses cryptographic security services to protect communications over IP networks. IPSec supports network-level peer authentication, data origin authentication, data integrity, data confidentiality (encryption), and replay protection. IPSec sits at the network level of the OSI model and as such it requires special installation into the operating system.

One significant advantage of IPSec, as shown in FIG. 5, is that IPSec creates a tunnel between the host 508 having IP address 10.15.16.25 (or between network 504 if the IPSec stack is installed in a firewall/router) and a far end secure gateway of network 506. Data traffic carried by the tunnel is subject to authentication and encryption. This has the advantage that generic TCP or UDP traffic can be transported securely inside the tunnel.

Figure 16:
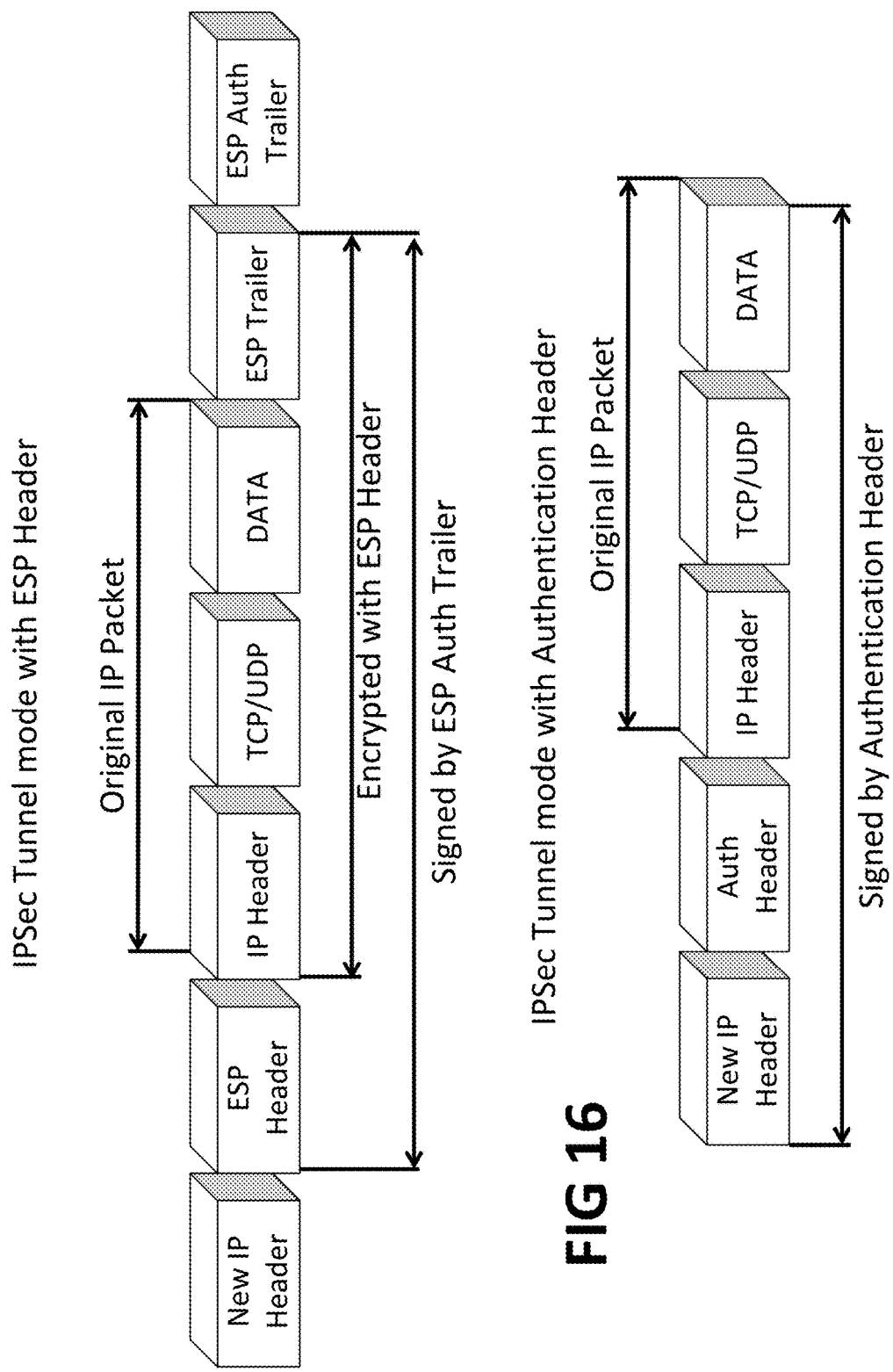
FIG. 16 illustrates IPSec packet makeup and encapsulation of standard IP packets carried in an IPSec tunnel.

Referring now to FIG. 16, the figure shows that IP traffic is "wrapped" with an IPSec header, either an Authentication Header or an ESP Header, the ESP Header typically being the most commonly used in IPSec VPN Tunnel configuration. With IPSec, either TCP or UDP traffic can be addressed directly to a destination UE using an IP address assigned to the UE. Therefore, when addressing multiple devices, in an aspect disclosed herein it becomes convenient to have the Application Server 1540 as shown in FIG. 15, address a UE 1531-1535 directly. to facilitate this, as disclosed above, session authentication credential information is associated with each of a group of UE devices in the VUEDB table 1524. Messages that are outside of the range of valid UE devices can be rejected or dropped and not delivered to the invalidity addressed UE as discussed above.

Continuing discussion of FIG. 15, the IPSec Gateway 1522 serves the purpose of authenticating and certifying the credentials of the far-end initiating IP station, Server 1540. Once the tunnel is setup, the IPSec Gateway 1522 preferably assigns an IP an address to the interface of initiating IP station 1540. The assigned IP address of Public Internet 1510 facilitates the initiating IP station being virtually "bridged" to local network 1502 via PASS 1520.

When IP messages are sent from the initiating IP station 1540, security IPSec credentials within one or more of the packets are evaluated by PSDEE 1523 which dips into VUEDB 1524 to determine if the credentials are recorded therein and associated with a UE device 1531-1535. If PSDEE determines that VUEDB contains a match to the security credentials send from initiating station 1540, the packets are deemed as validly corresponding to an IP address or label associated with the credential information or credential set in VUEDB, the PSDEE passes the packets to wireless network 1502 thru the SGi or Gi interface at private network connection 1504 by the Packet Filter Route or Block Element 1525.

Figure 17:
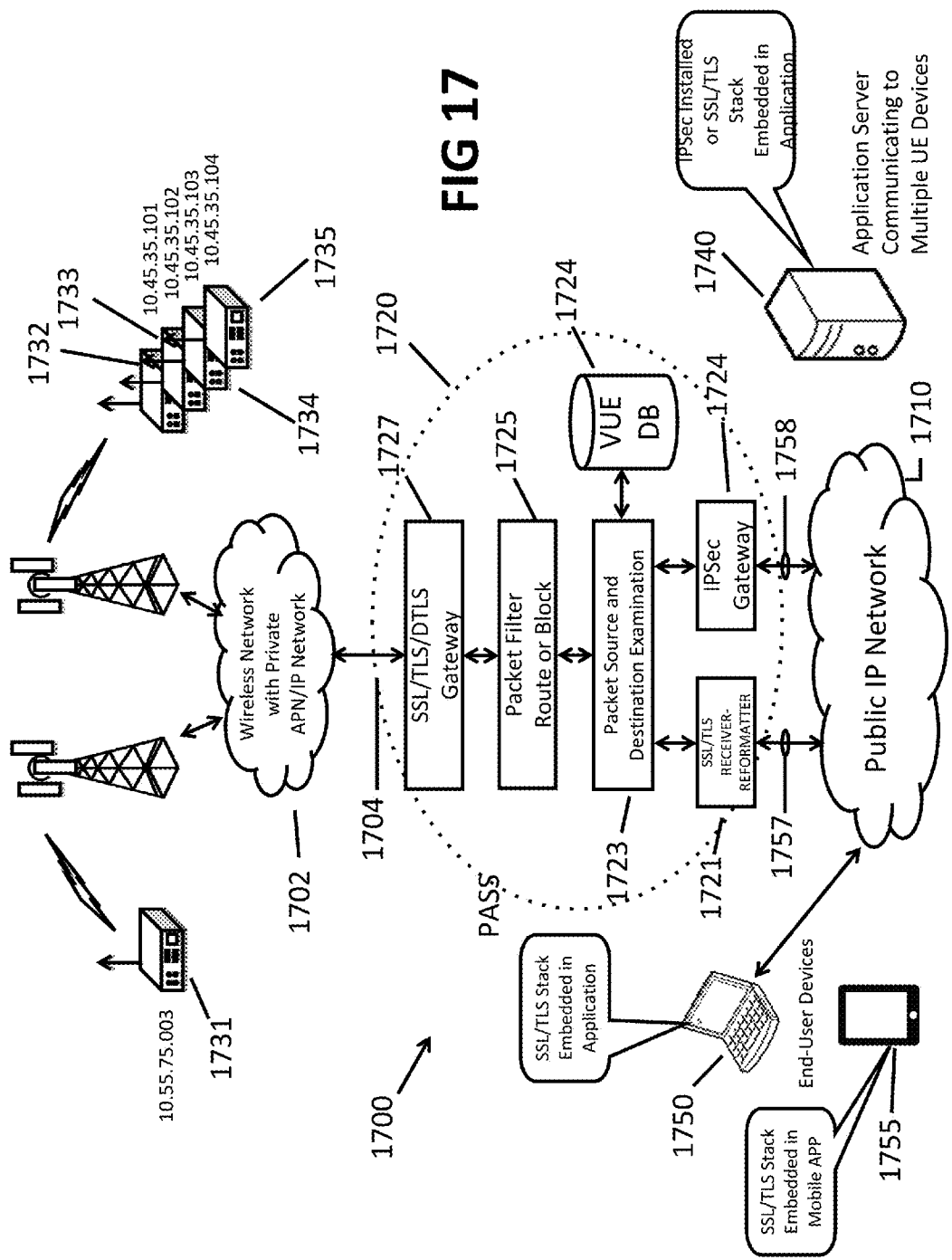
FIG. 17 illustrates a diagram of a networking system that uses a PASS with secure communication links with wireless UE devices.

System 1500 thus facilitates almost-instant delivery of IP messages to a UE device 1531-1535 connected to WWAN 1502 without requiring that the UE be in a continuously connected DATA-CONNECTED state. However, although PASS 1520 can separate all users from each other, it may be desirable to establish a higher level of security between devices or between devices and non-related Application Servers or non-related users. FIG. 17 illustrates an improved version of FIG. 15.

In FIG. 17, PASS 1720 interfaces to the public Internet 1710, Application Servers 1740, 1750, and 1755; and UE devices are similar to the corresponding devices described above in reference to FIG. 15. However, FIG. 17 shows an SSL/TLS/DTLS Security Gateway 1727 as part of PASS 1720 to add security between the packet filter 1725 and the UE devices 1731-1735.

Conventional wireless networks have provisioning configurations that permit UE Devices to connect to APNs, but block connections from one UE to another. However, security techniques applied to connections between a UE Device and PASS 1720 ensure an authentic connection and from a UE device's perspective, the controlling station is not operating on a fraudulent connection set up through a rogue base station on the wireless network. Selective attacks on WWAN devices have been demonstrated to compromise the communications of devices by setting up a fake or rogue base station, to which the GSM/GPRS/EDGE or LTE UE device might attach. Once attached, all communications on the WWAN can be monitored via man-in-the-middle attacks or controlled by simulated controllers. From the Application User perspective (i.e., an initiating device connected to public IP network 1710), setting up a secure connection to a UE Device ensures that commands or data sent to, or received from, the UE device are authentic and genuine and have not been modified vis-à-vis the original message sent by a sending device.

Preferably, data contained within security tunnels from the UE devices 1731-1735 or application servers 1740,1750, or 1755 to PASS 1720, is encrypted separately from the IPSec and SSL/TLS transport tunnels used over wireless network 1702 and public Internet 1710. Encrypting data separately means that data within PASS 1720 cannot be compromised within the PASS. Further, if data is directed to numerous Application Servers, for example for different applications using the same transport from a UE Device, separate encryption keys (i.e., separate from keys used for a basic communication tunnel) can allow complete security and separation. An attacker would not be able to fraudulently control or attack the UE Device based on knowledge of the security keys assigned to a global application.

Separate communication encryption keys would benefit IOT solutions where the device might have individual control functions as well as "big data" collection functionality. An example of this might an electric vehicle where the driver might need to access an M2M/IOT UE of (i.e., a telematics device coupled to a communication bus of the vehicle) the vehicle from his smart phone for charge status or climate pre-conditioning, but the automobile manufacturer might desire to monitor the battery charge and discharge characteristics to understand and estimate battery lifetime and replacement requirements. The control functions might use one security or encryption key (i.e., credentials, or a set of credentials) and the vehicle centric diagnostics might use a second security or encryption key. In this example, the user application on the PC, tablet or smart phone would have one set of security or encryption keys that would allow the user to interact with the vehicle with the services that are user-centric. The automobile manufacturer would have a different set of security or encryption keys that would allow the manufacturer to interact with the manufacturer-centric diagnostics without compromising the privacy of the driver by exposing location or other privacy related data elements. The data throughout the network would be encrypted and completely secure within the entire transport from the UE Device to the far-end device. It should be apparent that multiple security keys allow numerous secure virtual transport "tunnels" within the same physical transport tunnel. With proper organization, the PASS can function as a central interchange for WWAN based IOT devices, securely limiting or controlling access to the UE device, and performing message routing.

Figure 13:
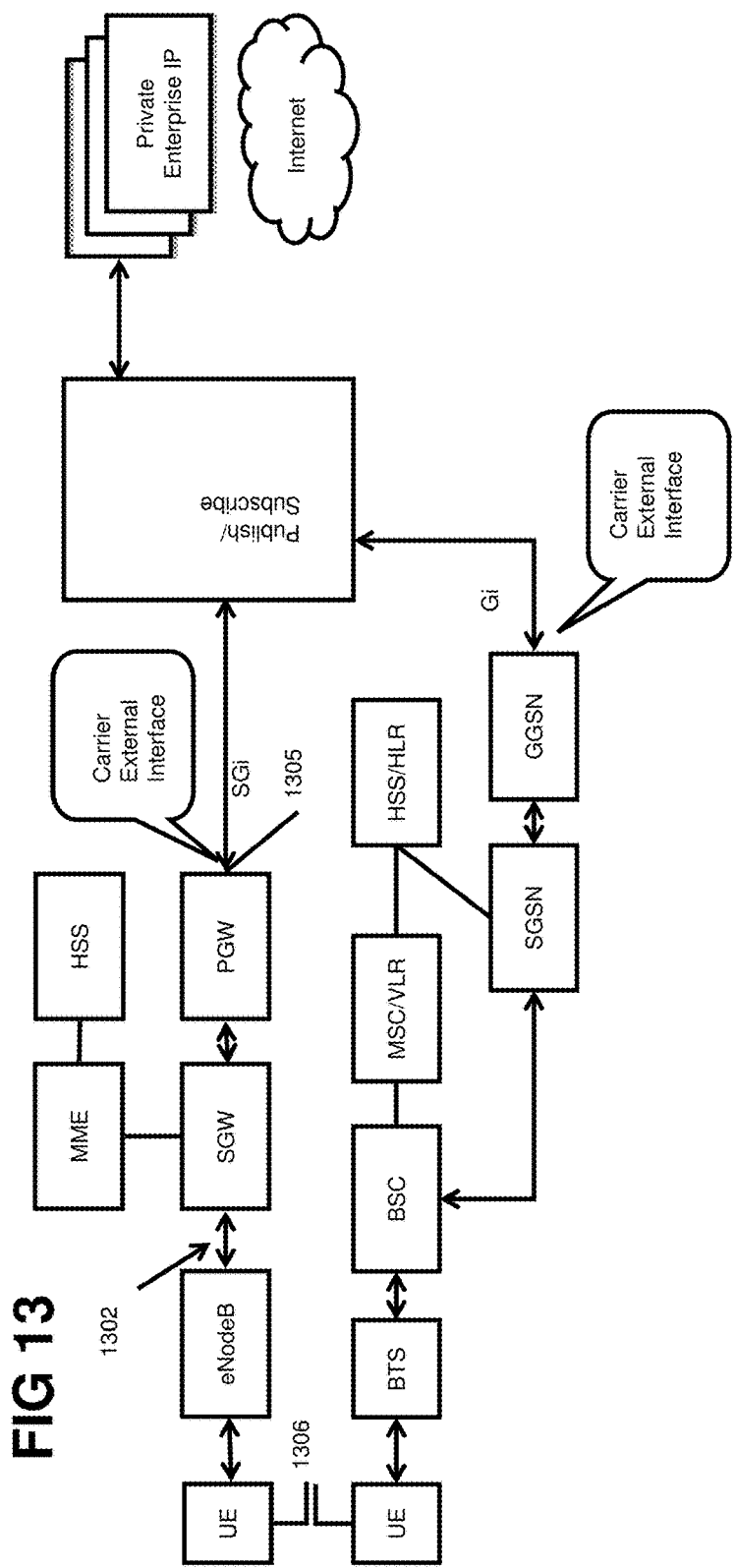
FIG. 13 illustrates a detailed system diagram with a publish/subscribe platform performing the functions of a PASS to translate between private IP addresses of the private wireless IP network and public IP addresses of the public Internet.
Figure 14:
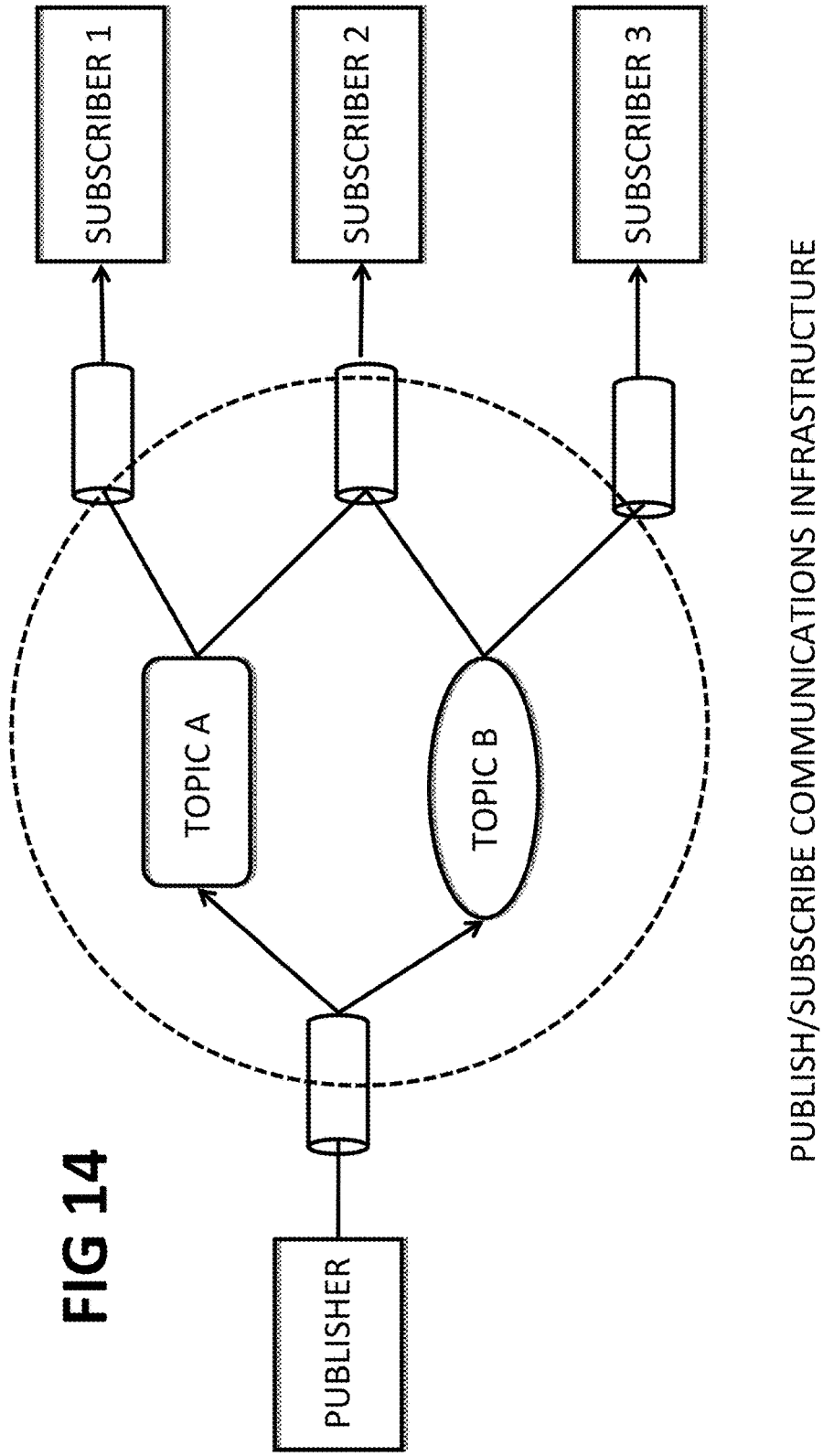
FIG. 14 illustrates a routing diagram followed by a typical publication and subscribe communications infrastructure.

In another aspect, a publish-subscribe platform may perform the role of a PASS to interface between the Internet or the private network external to the carrier SGi or Gi Interface established on the CXI side of the PGW or GGSN. This specific CXI connects to a specific and designated APN for the designated services. Turning to FIG. 13, the CXI of LTE network 1302 is shown at interface point 1305. A Publish-Subscribe communications architecture allows a UE 1306 to connect to a bus, broker, or to a device in a point-to-point topology.

A publish-subscribe pattern is a simple lightweight messaging protocol, designed for constrained devices and low-bandwidth, high latency, or unreliable networks. The design principles are to minimize network bandwidth and device resource requirements while also attempting to ensure reliability and some degree of assurance of delivery. The principles of a publish/subscribe protocol are ideal for the emerging machine-to-machine ("M2M") or IOT-connected devices where bandwidth and battery power are at a premium.

In software architecture, publish-subscribe ("pub-sub") is a messaging pattern where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are.

In a typical pub-sub system, publisher devices post message to an intermediary message broker or event bus, and subscriber devices register subscriptions with that broker, letting the broker perform message filtering. The broker normally performs a store and forward function to route messages from publisher devices to subscriber devices. In addition, the broker may prioritize a message in a queue before routing. In some of the more popular pub-sub systems, the subscriber is also a client in the client/server context and as such, the client initiates the connection to the server. Typically, the subscriber is a peer and the connection is initiated from the intermediary message broker. If the intermediary message broker initiates the connection only when messages exist for a specific subscriber, the bandwidth, power, and delivery speed is optimized.

When using a pub-sub platform to perform some of the functionality of a PASS, though not required, it is preferred that encryption and authentication be implemented to prevent the message broker from sending messages to the wrong client and to prevent an unauthorized publisher from introducing incorrect or damaging messages into the pub/sub system. Although encryption and authentication can prevent unauthorized access it cannot prevent damaging messages from being introduced by publisher devices that are generally authorized to use the pub-sub platform. If the pub-sub platform is shared among different operators or different applications, it becomes important to install a system for separating various IP initiators from each other and for blocking the access of an IP initiator to UE devices that are outside of the IP initiator's ecosystem (i.e., to prevent messages from an IP initiator device from reaching UE devices that are not associated as being 'subscribers' of messages from the initiating device). It is important to control the publication and subscription of messages to only those M2M/IOT UE devices within a specific group.

Pub-sub platforms are well known systems and operate with several different variations, and those variations can be used advantageously in performing PASS functionality. One variation is a list-based system, which delivers events or messages based on a subscription list. Another variation is a content-based system that allows subscribers to determine the applicability of a message that may be published. A third variation, though not as applicable for M2M devices is a broadcast-based system that sends the message to all devices on the network. Once the message has been delivered, the subscriber can decide the applicability of the message. This variation could potentially waste relatively expensive data bandwidth, delivering content to uninterested 'subscribers'.

An aspect delivers a message from the pub-sub platform directly to an attached wireless UE device. Although some pub-sub systems may depend upon the subscriber (i.e., a UE) or client (i.e., an initiating station such as devices 1540, 1550, or 1555 in FIG. 15) to initiate communication with the pub-sub platform/server, clients preferably initiate communications as a publisher, and the pub-sub server accesses the IP address(es) from a table such as, for example, VUEDB 1525 shown in FIG. 15, of interested 'subscribers', such as UE devices 1531-1535, based on security credentials received from the initiating device/publisher. The pub-sub server may then initiate communication with UE device 'subscribers' causing them to receive the subscribed message sent from the initiating device, whether the UE device/subscriber device is connected to the wireless system in a DATA-CONNECTED state or not.

This system preferably uses identifiers other than IP address to identify publishers and subscribers. This allows flexibility if IP addresses change. It is possible that "fixed-assigned" IP addresses are not associated with a device in a table in an initiating device application server, but a UE, upon its activation, may provide IP address mapping through the pub-sub server to the IP initiator application server. However, the pub-sub server preferably maps a publisher ID and subscriber ID/label with an IP address of the M2M/IOT UE device. This address mapping may occur in a table such as VUEDB 1524 shown in FIG. 15.

In an aspect, all communications stacks and software can be contained externally to an M2M/IOT UE sensor device, processor, computing, or collector device. It is contemplated that a wireless modem or communications transceiver or other communications platform, connects to the sensor device using any communications bus technology, including, but not limited to USB, Ethernet, I2S, I2C, RS-232 serial, RS-485 serial, parallel, Thunderbolt, SATA, fiber, WiFi, Z-Wave, Zigbee, or any other communications channel, whether of current design or future design, wired or wireless, that attaches to a sensor platform and contains any combination of the required software or hardware to implement a secure, remote connection.

Aspects disclosed herein contemplate adding software to a traditional wireless USB modem, said modem normally attaching to an end-user's computer to initiate outgoing action request messages, for example a request-to-connect message, for remote access to the WWAN and wireless Internet, said added software supporting the capability of securely monitoring for specific incoming connections from a PASS platform, said added software including optionally, but preferably, authentication, encryption, and certification software, while allowing said wireless USB modem to enable otherwise insecure and unconnected devices to connect to and share data with other computers, platforms, application servers, and end-users over the WWAN. Said USB modem may or may not support UE-initiated communications, and may or may not support authentication, encryption, and certification of the data on those outgoing connections.

Figure 18:
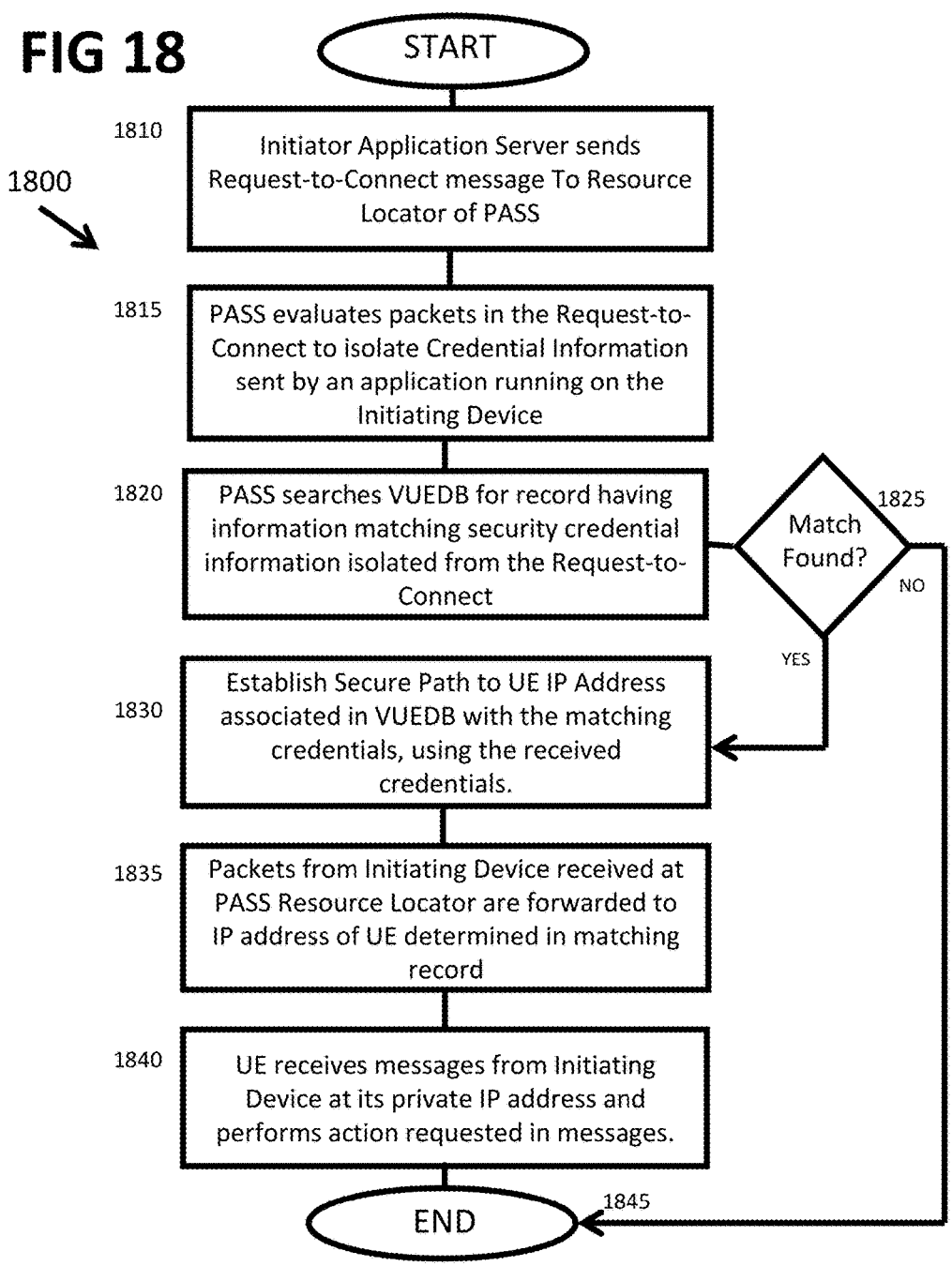
FIG. 18 illustrates a flow diagram of a method for establishing communication between a public-Internet-connected device and an IoT device in an IDLE state having an IP address of a private communication network wherein the initiating device does not have access to the private network address of the IoT device.

Turning now to FIG. 18, the figure shows a flow diagram that illustrates method 1800 for connecting a requesting device of a public network to a device of a private managed network when the device of the public network does not have access to an IP address of the device of the private network. Method 1800 starts at step 1805 when a decision is made, or action occurs, at an initiating device having a network connection to a public network to request an action by a device having a network connection to a private communication network. An application running on the initiating device/application server generates a request message to be sent to the private-connected device, which may be a UE connected to a wireless communication network and wherein the UE connected to the wireless network has a network connection to a private network, such as a private IP network. At step 1810 the initiating device sends the request message toward the UE device that it seeks to cause to take an action, wherein such action may be to wake up, to connect to the private network, to send information as a reply message, or to send a command to a sensor or actuator (such as a vehicle door unlock actuator or a vehicle HVAC system) coupled to the UE device. The initiating device sends the message as one or more IP packets to a destination address, or resource locator, such as a uniform resource locator, that corresponds to a PASS server that has connections, whether physical, logical, virtual, to the private network and to the public network. The action request message typically includes a set of authentication/security credentials that may include a username/password, a pre-shared key, or a public key a public/private key pair, etc. that may be used to create a secure path or tunnel from the initiating device.

After receiving the action request message, at step 1815 the PASS evaluates the action request message and isolates the set of security credentials from one or more packets that compose the action request message. The PASS may use the credentials received in the action request message to implement a secure session or a secure data tunnel from the initiating device.

In addition, the PASS uses the set of credentials received from the initiating device's application to look up, at step

1820, a record in a VUEDB that may be associated with the credentials. The application running on the initiating device may have chosen the credentials (either automatically, or in response to a selection that a user may have manually made using a user interface of the application or device) to send with the action request message based on a label of a device it is seeking to communicate with. Records in the VUEDB are preferably indexed on a field that contains credentials, and each record preferably associates information corresponding to a UE device, including an IP address or a URL of the UE device, that has been assigned to the UE device from a range of private IP addresses of a private managed network that the UE is part of. Records in the VUEDB may contain other fields of data related to the UE, such as equipment that the UE may be part of, coupled to, have control of, the type of network it is part of, the type(s) of security protocol it supports, etc.

If the PASS determines at step 1825 that a record was not located in the VUEDB that has credential information that matches the credentials contained in the action request message sent at step 1810, method 1800 advances to step 1845 and ends.

However, if the PASS determines at step 1825 that a record was located in the VUEDB that has credential information that matches the set of credentials contained in the request message sent at step 1810, the PASS may establish at step 1830 a secure session or tunnel with the initiating device based on the credentials received in the action request message. At step 1835, packets from the initiating device are forwarded to, or toward, the private IP address contained in the record from the VUEDB that had credential information that matched the credential set that the PASS received in the request message that was sent at step 1810. At step 1840, the UE receives message packets from the initiating device at its private IP address and performs what ever action may have been included in the action request message, which action may be as simple as causing the UE to transition to an ECM-CONNECTED state to connect to the private network that its private IP address is part of.

Figure 19:
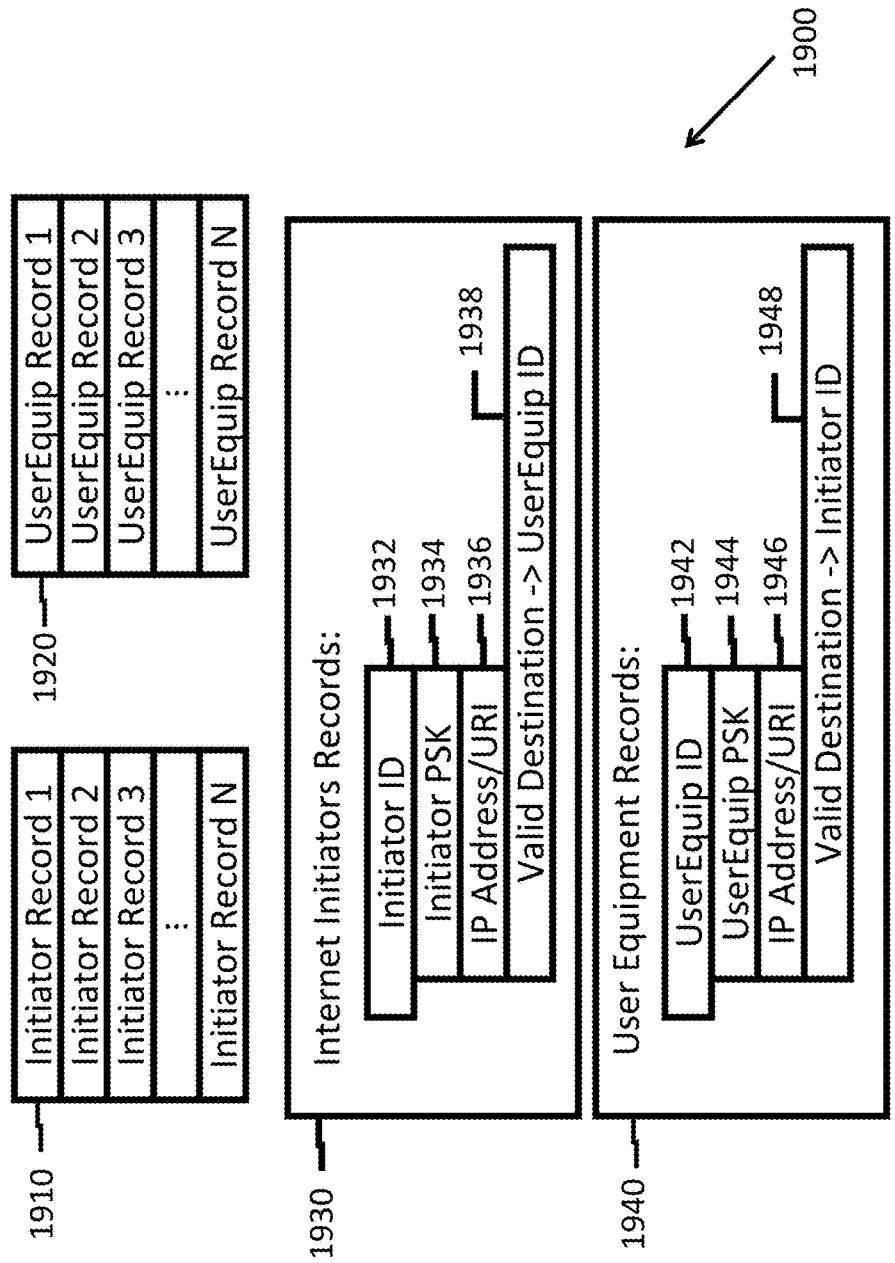
FIG. 19 illustrates a verified user equipment schema that may be used by a PASS to establish a connection between a public-internet-connected initiator device and a private-network connected UE device based on information corresponding to the initiator device.

FIG. 19 illustrates a typical VUEDM database schema 1900 for use by a PASS system similar to the PASS shown in FIG. 17. This schema implementation facilitates operation of a PASS in a system that uses SSL/TLS/DTLS or IPSec access control with credentials that identifies the connected End-User Internet Initiator devices 1750, 1755, or 1740. In the preferred implementation each Internet Initiator device has a unique Initiator device ID and Initiator Pre-shared Key [PSK] that identify and authenticate a secure VPN connection into a PASS via the Internet. The Initiator ID becomes the database access key into the list of possible Internet Initiators shown at 1910, which list in the VUEDB is preferably indexed on an initiator ID field. Each Internet Initiator will have a separate corresponding record with the schema for the record shown at block 1930. Block 1930 shows each record containing an Initiator ID associated with each valid Initiator, an Initiator PSK, an IP Address or Universal Resource Identifier [URI], which could be a string of characters to identify a resource, or URL, and a Valid Destination User Equipment ID. This aspect facilitates the PASS in granting the Initiator access to a single UE based on the access credentials of the initiator device. It will be appreciated that the PASS may use an initiator device's security credentials, such as a pre-shared key, as the Initiator ID.

Each User Equipment Record shown at 1920 contains the necessary security credentials to identify and authenticate the destination device. Each User Equipment ID is unique and identifies a record that contains a PSK, an IP Address or URI, and a valid Initiator ID. The User Equipment Record layout is shown at 1940. This system design is created to allow one device in the public Internet to communicate with one device in the private wireless APN network based on one set of credentials of the initiator device.

As discussed above, schema 1900 includes records corresponding to initiator devices that may be connected to a public communication network, such as the public Internet, or World Wide Web. Schema 1900 also shows a plurality of UE records corresponding to a plurality of wireless UE devices that may be connected to a private network corresponding to a given APN that the wireless UE devices may be part of, and thus the records have network addresses of the private network assigned to the UE devices for the given APN network (a given APN corresponds to a private network and is the access point name of a network node, typically a gateway, that traffic passes through between the private network and one or more other networks). Record 1930 illustrates an example of a typical record corresponding to a particular public-network-connected device having any one of records 1910 (1-N), such as a laptop computer, a wireless tablet, a wireless smart phone, a desktop personal computer, an enterprise server computer, etc. Record 1930 may include an initiator identifier 1932 associated with the one of the plurality of initiator devices corresponding to the one of the plurality of records 1910. An initiator record 1930 typically also includes pre-shared key information of the corresponding initiator device, a public IP address 1936 of the public communication network corresponding to the particular initiator device (instead of an IP address field 1936 could include a label such as a URL). And, record 1930 includes a permitted destination device field 1938 containing information corresponding to a UE device that may be connected to a given private managed network, with which UE device the particular initiating device has been previously associated in the VUEDB. Such information in field 1938 may include a name of, a unique identifier of, or an addresses assigned to, a user equipment device. It will be appreciated that a VUEDB may contain a group of more than one initiator record 1930 with each of the initiator records of the group having the same initiator ID in field 1932. These multiple records might exist to associate multiple UE devices (i.e., different destination devices identified in field 1938) with the same initiator device. In such a scenario, a PASS might perform steps 1820-1835 shown in FIG. 18 for each match of information in fields 1932, 1934, or 1936 with information in an action request message packet, or packets, received from an initiating message, such as packets of a request-to-connect message sent at step 1810 as illustrated in FIG. 18.

Continuing with discussion of FIG. 19, destination user equipment record 1940 illustrates data field details that any one of records 1920 (1-N) may include. User equipment ID field 1942 includes a user equipment device identifier. Such identifier typically corresponds to UE device that is part of a private communication network corresponding to a given APN. If a PASS device/system determines that a match exists between initiator device information (such as security credential information) associated with an initiating device of a public network received in an incoming request message and one of records 1910, the PASS evaluates information in destination device field 1938 of the matching record to determine a user equipment record 1940 from records 1920 having information in user equipment ID field 1942 of record 1940 that matches the information in field 1938 of record 1930 for further processing. A PASS may perform this determining of a destination user equipment record 1940 that matches information from initiating record 1930 at step 1825 as shown in FIG. 18. Upon determining one, or more, records 1920 that match initiator information of record 1930 that corresponds to one of initiator records 1910, the PASS typically forwards the incoming message from the initiator device that corresponds to record 1930 to a UE device corresponding to information contained in user equipment private IP address/URL field 1946. Valid destination field 1948 may be used by a UE device to initiate communication to a Initiator device destination from a UE.

Turning now to FIG. 20, the figure illustrates database schema 2000 that may be used in a PASS system wherein a pub-sub broker is used for PASS functionality and message routing. A distinguishing feature of this pub-sub/PASS aspect compared to the SSL/TLS/DTLS or IPSec aspect described above in reference to FIG. 19 is the ease with which an initiator device may easily communicate securely with multiple devices using the pub-sub pattern. As shown in FIG. 20, schema 2000 shows two sets of records corresponding to Internet Initiators and User Equipment devices. Block 2010 shows the structure of a record corresponding an initiator device and the structure shown in block 2020 contains records for one or more User Equipment devices.

The structure of an Internet Initiator device record 2010 is similar to the structure a User Equipment Record 2020 insofar as each contains a valid Initiator ID or User Equipment ID, depending on whether the record is an initiator record or a UE device record. Each record also contains a respective PSK 2011 or PSK 2021 corresponding to either an associated initiator device or a an associated user equipment device; using pre-shared keys may be preferred when using SSL/TLS/DTLS or IPSec sessions for communications. Each initiator device record 2010 or user equipment device record 2020 contains an IP Address or URI (2013 or 2023) for its corresponding device as given in respective initiator IDs 2014 or 2024. As with the data stored in records 1930 and 1940 shown in FIG. 19, it will be appreciated that the data in records 2010 and 2020 shown in FIG. 20 have been pre-established and pre-stored in VUEDB by a PASS operator that an operator of a private managed network trusts. The operator of the private network has typically provided valid initiator device credentials to the PASS operator for inclusion in record 2010 (or records 1910 as shown in FIG. 19). The pre-establishing and pre-storing occurs before a PASS, whether an SSL/TLS-implemented PASS or a pub-sub-implement PASS, can provide a connection to one or more UEs of a private network from an initiating device of a public network based on security credentials of the initiating device in an initiating action request message from the initiating device without a destination device's network address of the private network being included in the initiating action request message. This facilitates message delivery via the pub-sub broker destined to one or more User Equipment devices that do not currently have an active data connection (i.e., an LTE UE device in ECM IDLE state). Each of records 2010 and 2020 contains one or more Topic Rules 2015 and 2025, respectively, which the pub-sub PASS platform may use to determine one or more private networks to publish a message to, or to determine one or more UE devices to publish a message to, based on one or more topic rules 2025 that one or more UE devices may subscribe to. Each topic rule may correspond to one of a plurality of private networks, for example all devices of the given private network may subscribe to Topic Rule 3 of topic rules 2015. Or, a topic rule may correspond to one or more of a plurality of UE devices, either within a private network or distributed among more than one private network. For example, only one UE device may subscribe to Topic Rule 3 and thus the pub-sub PASS would only forward a message published by an initiator as Topic Rule 3 to a network having a UE that subscribes to Topic Rule 3; or, the pub-sub PASS may forward the message published to Topic Rule 3 to UEs in multiple networks if the UEs all subscribe to Topic Rule 3. Each Topic Rule shown at 2030, identifies a pub-sub topic and whether the device, either the Internet Initiator or the User Equipment is allowed/preconfigured to read (or subscribe), write (or publish) or read and write. In a conventional pub-sub environment, a UE device normally would be connected to the pub-sub broker to receive messages. In the environment where a pub-sub broker is used as a PASS, the pub-sub broker uses the IP Address/URI 2013 (or alternatively a set of security credentials) corresponding to an initiator device to trigger the delivery of a message having an indication of a particular topic rule to an IP address 2023 corresponding to a UE that has subscribed to the particular topic rule.

What is claimed is:

1. A system, comprising:
   a translating device, comprising:
   a processor;
   wherein the translating device is associated with a single resource locator of a public communication network that a requesting initiator device coupled to the public communication network uses as destination information when sending messages to the network translating device;
   a valid user equipment database for use in translating an action request message directed to the resource locator from the requesting initiator device into an action request message directed to one of a plurality of private network addresses corresponding to one of a plurality of managed devices of a managed private communication network, wherein the one of the plurality of managed devices of the managed private communication network does not have a public network address associated with it, and wherein the valid user equipment database includes an association of a set of security credentials of the initiator device, transmitted in the action request message, with the one of the plurality of private network addresses that corresponds to the one the plurality of managed devices of the managed private network, and
   wherein the processor is to determine, from the valid user equipment database based on the set of security credentials of the initiating device received from the initiating device in the action request message, the one of the private network addresses to direct the action request message to when the set of security credentials of the initiating device corresponds to the one of the private network addresses, wherein the set of security credentials of the initiating device is uniquely associated with the initiator device in the valid-user-equipment database;
   wherein the processor is to forward one or more packets composing the action request message according to the one of the plurality of private network addresses corresponding to the one or more user equipment devices of the private communication network; and
   wherein the action request message does not provide identifying information of a device from which action is requested.

2. The system of claim 1 wherein the single resource locator of the network translating device is a uniform resource locator of the public communication network.

3. The system of claim 1 wherein the valid user equipment database associates the requesting initiator device with a plurality of unique sets of security credentials, wherein each of the plurality of sets of security credentials corresponds to a particular one of the plurality of managed devices coupled to the managed private network.

4. The system of claim 1 wherein the action-request message is a trigger to cause the one of the plurality of managed devices to transition from an idle state to a connected state.

5. The system of claim 1 further comprising a virtual private network tunnel between the requesting initiator device and the one of the plurality of managed devices, wherein the network translating device creates and manages the virtual private network tunnel.

6. The system of claim 1 wherein the plurality of private network addresses corresponding to the plurality of managed devices of the managed private network are internet protocol addresses, but not IPv6 addresses.

7. The system of claim 3 wherein an application of the requesting initiator device that transmits the action-request message inserts the set of security credentials into the request-to-connect message based on a desired managed user equipment device that the action-request message is directed to.

8. The system of claim 1 wherein the translating device is a publish-subscribe platform that is in communication with the public communication network and that is in communication with the private managed communication.

9. The system of claim 8 wherein the publish-subscribe platform processes the set of security credentials to retrieve unique managed device data, which corresponds to the received set of security credentials, from the valid-user equipment database and processes the retrieved unique managed device data to determine an IP address of the private managed communication network to which an incoming message should be delivered.

10. The system of claim 8 wherein the publish-subscribe platform does not cache incoming messages indefinitely for the destination device.

11. The system of claim 8 wherein the one of the plurality of managed devices subscribes to a given topic rule and initiates the establishment of a data session connection to the private managed communication network if it receives an action request message corresponding to the given topic rule.

12. The system of claim 4 wherein the particular one of the plurality of managed devices of the managed private network is currently not in a data-connected state when the initiator device generates the action-request message.

13. The system of claim 1 wherein the private network connection and the public network connection are separate SGi interfaces.

14. The system of claim 1 wherein the set of security credentials of a given initiator device is associated in the valid user equipment database as corresponding to the one of the plurality of user equipment devices after the initiator device has been authorized to communicate with the one of the plurality of managed devices via the managed private network.

15. A method, comprising:
receiving at a translating device, which is in communication with a public communication network and a private communication network and which is configured to implement functionality of a Public Access Secure Server, an action request message from an application running on an initiating device connected to a public communication network, wherein the action request message includes unique identifying information associated with the initiating device;
determining the identifying information associated with the initiating device from the action request message;
searching a valid user equipment database for one or more records having data in an initiator device identification field that matches the identifying information associated with the initiating device, wherein the one or more matching records includes destination information corresponding to one or more user equipment devices of the private communication network, and wherein the action request message does not include identifying information of the one or more user equipment devices; and
forwarding one or more packets composing the action request message according to the destination information corresponding to the one or more user equipment devices of the private communication network.

16. The method of claim 15 wherein the unique identifying information associated with the initiating device includes security credentials.

17. The method of claim 16 wherein the security credentials include a pre-shared key.

18. The method of claim 15 wherein the destination information corresponding to the one or more user equipment devices of the private communication network includes one or more network addresses uniquely corresponding to the one or more user equipment devices.

19. The method of claim 16 further comprising establishing a secure session between the initiating device and the Public Access Secure Server functionality of the translating device using the security credentials included in the action request message.

20. The method of claim 15 wherein the action request message includes a topic rule and wherein the Public Access Secure Server functionality is implemented by a publish-subscribe application running on the translating device.

21. The method of claim 20 wherein the destination information corresponding to the one or more user equipment devices includes topic rules to which the one or more user equipment devices each subscribe.

22. A translating device, comprising:
a processor to:
receive at a translating device, which is in communication with a public communication network and a private communication network and which is configured to implement functionality of a Public Access Secure Server, an action request message from an application running on an initiating device connected to the public communication network, wherein the action request message includes unique identifying information associated with the initiating device;
determine the identifying information associated with the initiating device from the action request message;
search a valid user equipment database for one or more records having data in an initiator device identification field that matches the identifying information associated with the initiating device, wherein the one or more matching records include identifying information of one or more user equipment devices of the private communication network, wherein the action request message does not include the identifying information of the one or more user equipment devices of the private communication network; and forward one or more packets composing the action request message according to the identifying information of the one or more user equipment devices of the private communication network.

23. The translating device of claim 22 wherein the identifying information associated with the initiating device includes security credential data.

* * * * *